US012748659B2

(12) United States Patent
Chen et al.

(10) Patent No.: US 12,748,659 B2
(45) Date of Patent: Sep. 29, 2026

(54) DATA WRITING METHOD AND PROCESSING SYSTEM

(71) Applicant: Huawei Technologies Co., Ltd., Shenzhen (CN)

(72) Inventors: Zhiyong Chen, Shenzhen (CN); Yining Li, Shenzhen (CN); Chengchao Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 82 days.

(21) Appl. No.: 18/920,383

(22) Filed: Oct. 18, 2024

(65) Prior Publication Data

US 2025/0045158 A1 Feb. 6, 2025

Related U.S. Application Data

(63) Continuation of application No. PCT/CN2023/089083, filed on Apr. 19, 2023.

(30) Foreign Application Priority Data

Apr. 19, 2022 (CN) ......................... 202210411764.4

(51) Int. Cl.
*G06F 11/10* (2006.01)

(52) U.S. Cl.
CPC ...... *G06F 11/1044* (2013.01); *G06F 11/1048* (2013.01); *G06F 11/1068* (2013.01)

(58) Field of Classification Search
CPC ............. G06F 11/1068; G06F 11/1048; G06F 2212/1032; G06F 12/0284; G06F 11/1044; G06F 3/061; G06F 3/0629; G06F 12/0223
See application file for complete search history.

(56) References Cited

U.S. PATENT DOCUMENTS 5,136,592 A 8/1992 Weng
7,620,875 B1 * 11/2009 Nelson ................ G06F 11/1044 714/763

(Continued)

FOREIGN PATENT DOCUMENTS

CN 103839595 A 6/2014
CN 107068194 A 8/2017

(Continued)

OTHER PUBLICATIONS

Tan Jie, 1G Bit embedded ECC DDR3 DRAM Chip design, China Integrated Circuit, Sep. 2018, total 6 pages.

*Primary Examiner* — Steve N Nguyen
(74) *Attorney, Agent, or Firm* — Conley Rose, P.C.

(57) ABSTRACT

A processing system includes a first memory. The processing system is configured to obtain first data, where the first data is data to be written into the first memory; determine, based on first error distribution area information of at least one memory space included in the first memory, a first arrangement manner of a memory space occupied by a data symbol; determine the first data as M data symbols based on the first arrangement manner of the memory space occupied by the data symbol, where each of the M data symbols includes a plurality of data bits; perform first error correction code encoding on the M data symbols to obtain N first redundant symbols; and write the M data symbols and the N first redundant symbols into the first memory.

20 Claims, 13 Drawing Sheets

(56) References Cited

U.S. PATENT DOCUMENTS

| | | | | |
|---|---|---|---|---|
| 11,061,930 | B1 * | 7/2021 | Golding | G06F 3/0611 |
| 11,237,902 | B2 * | 2/2022 | Zhu | G06F 11/3055 |
| 11,687,251 | B2 * | 6/2023 | Greathouse | G06F 3/0619 711/154 |
| 2010/0211820 | A1 * | 8/2010 | Kim | G11C 29/81 711/E12.001 |
| 2011/0078527 | A1 | 3/2011 | Seshadri et al. | |
| 2013/0007541 | A1 | 1/2013 | Carman et al. | |
| 2016/0283318 | A1 * | 9/2016 | Das | G06F 11/1048 |
| 2018/0267851 | A1 * | 9/2018 | Kaynak | H03M 13/152 |
| 2020/0201709 | A1 | 6/2020 | Song et al. | |

FOREIGN PATENT DOCUMENTS

| | | | |
|---|---|---|---|
| CN | 112579342 | A | 3/2021 |
| CN | 113076219 | A | 7/2021 |
| CN | 113485866 | A | 10/2021 |

* cited by examiner

DATA WRITING METHOD AND PROCESSING SYSTEM

CROSS-REFERENCE TO RELATED APPLICATIONS

This is a continuation of Int'l Patent App. No. PCT/CN2023/089083, filed on Apr. 19, 2023, which claims priority to Chinese Patent App. No. 202210411764.4, filed on Apr. 19, 2022, all of which are incorporated by reference.

FIELD

This disclosure relates to the field of computer technologies, and in particular, to a data writing method and a processing system.

BACKGROUND

In the field of computers, reliability of memory data, especially system core data or important application data, is critical to performance of the entire system. The reliability of the data directly affects running of the entire system. Therefore, a data error correction technology emerges. Whether current data is correct data is determined by using the error correction technology and a predetermined error correction algorithm, to determine reliability of the currently read data.

Currently, an error correction code (ECC) technology is used for correcting data errors. As specifications of a double data rate synchronous dynamic random-access memory (DDR) 3 (DDR3) device, a DDR4 device, and a DDR5 device increase, an advanced manufacturing process decreases. A voltage of a DDR decreases, and an amount of charge that a capacitor of each storage unit can hold decreases. As a result, a transient error or a soft error is likely to occur. A trend is that a transient error causes an increase in a probability of a multi-bit error. Therefore, how to perform ECC encoding on data to improve a data error correction capability when a data error occurs is an urgent problem to be resolved currently.

SUMMARY

This disclosure provides a data writing method and a processing system, to improve an error detection capability and an error correction capability of a processing system, and improve system reliability.

A first aspect provides a data writing method, where the method is applied to a processing system, the processing system includes a first memory, and the first memory includes a plurality of memory spaces; and the method includes: obtaining first data, where the first data is data to be written into the first memory; determining, based on first error distribution area information of at least one memory space in the plurality of memory spaces, a first arrangement manner of a memory space occupied by a data symbol; determining the first data as M data symbols based on the first arrangement manner of the memory space occupied by the data symbol, where each of the M data symbols includes a plurality of data bits, and M is an integer greater than or equal to 1; performing first ECC encoding on the M data symbols to obtain N first redundant symbols, where each of the N first redundant symbols includes at least one redundant bit, and N is an integer greater than or equal to 1; and writing the M data symbols into a data memory space of the first memory, and writing the N first redundant symbols into a first ECC memory space of the first memory.

In the foregoing technical solution, the processing system determines, based on the first error distribution area information of the at least one memory space in the plurality of memory spaces, the first arrangement manner of the memory space occupied by the data symbol. In other words, the processing system designs, with reference to distribution of error areas in the at least one memory space, an arrangement manner of the memory space occupied by the data symbol. Then, the processing system determines the first data as the M data symbols with reference to the first arrangement manner of the memory space occupied by the data symbol, where each of the M data symbols includes the data bits. Because destination addresses of the data bits in the first data are known, the processing system divides, with reference to the first arrangement manner, the data bits that are in the first data and that can form a shape of the first arrangement manner into a same data symbol. Therefore, this helps perform maximized error detection and maximized error correction on data in a subsequent data reading process of the processing system. An error detection capability and an error correction capability of the processing system are improved, and system reliability is improved. In this way, a maximized error detection capability and a maximized error correction capability of the first ECC memory space of the first memory are fully utilized, a data error area is covered to a maximum extent, and the system reliability is improved.

In a possible implementation, the first error distribution area information of the at least one memory space indicates a specific area, in the at least one memory space, in which an error data bit falls when a data error occurs in the at least one memory space.

In this implementation, the first error distribution area information indicates an area range in which the error data bit usually falls when the data error occurs in the at least one memory space. Generally, the area range is less than a size of the at least one memory space. Therefore, the processing system can determine, with reference to the area range, an arrangement manner of the memory space occupied by the data symbol. Then, the processing system divides, with reference to the first arrangement manner, the data bits that are in the first data and that can form the shape of the first arrangement manner into a same data symbol. Therefore, this helps perform maximized error detection and maximized error correction on the data in the subsequent data reading process of the processing system. The error detection capability and the error correction capability of the processing system are improved, and the system reliability is improved. In this way, the maximized error detection capability and the maximized error correction capability of the first ECC memory space of the first memory are fully utilized, the data error area is covered to the maximum extent, and the system reliability is improved.

In another possible implementation, each data symbol occupies an 8-bit memory space, and the first arrangement manner of the memory space occupied by the data symbol includes any one of the following: arrangement in four rows and two columns, arrangement in two rows and four columns, arrangement in eight rows and one column, and arrangement in one row and eight columns; or each data symbol occupies a 16-bit memory space, and the first arrangement manner of the memory space occupied by the data symbol includes any one of the following: arrangement in four rows and four columns, arrangement in eight rows and two columns, arrangement in two rows and eight columns, and arrangement in 16 rows and one column; or each data symbol occupies a 32-bit memory space, and the first arrangement manner of the memory space occupied by the data symbol includes any one of the following: arrangement in one row and 32 columns, arrangement in 32 rows and one column, arrangement in two rows and 16 columns, arrangement in 16 rows and two columns, arrangement in four rows and eight columns, and arrangement in eight rows and four columns.

In this implementation, some possible implementations of a quantity of data bits included in the data symbol are provided, and a plurality of possible arrangement manners of the memory space occupied by the data symbol in each implementation are further shown, to provide a specific basis for implementation of the solution. This helps the processing system select an appropriate arrangement manner with reference to these arrangement manners and the first error distribution area information. This facilitates the maximized error detection and the maximized error correction on the data in the subsequent data reading process of the processing system. The error detection capability and the error correction capability of the processing system are improved, and the system reliability is improved.

In another possible implementation, the method further includes: obtaining the first error distribution area information of the at least one memory space in the plurality of memory spaces.

In this implementation, the processing system may obtain the first error distribution area information, so that the processing system determines the first arrangement manner of the memory space occupied by the data symbol. For example, the processing system may obtain the first error distribution area information through an external interface. Alternatively, the processing system obtains the first error distribution area information by using preconfigured information.

In another possible implementation, the method further includes: reading all data from the first memory, where all the data includes data bits and a redundant bit; determining, based on second error distribution area information of the at least one memory space in the plurality of memory spaces, a second arrangement manner of the memory space occupied by the data symbol; determining the data bits in all the data as P data symbols based on the second arrangement manner of the memory space occupied by the data symbol, where each of the P data symbols includes a plurality of data bits, and P is an integer greater than or equal to 1; performing first ECC encoding on the P data symbols to obtain Q first redundant symbols, where each of the Q first redundant symbols includes at least one redundant bit, and Q is an integer greater than or equal to 1; and writing the P data symbols into the data memory space of the first memory, and writing the Q first redundant symbols into the first ECC memory space of the first memory.

In this implementation, if error distribution area information of the at least one memory space is changed to the second error distribution area information, the processing system may read all the data from the first memory, and then determine, with reference to the second error distribution area information, the second arrangement manner of the memory space occupied by the data symbol. Then, the processing system performs encoding based on the second arrangement manner and the data bits in all the data. Therefore, an arrangement manner of the memory space occupied by the data symbol is changed, and the processing system can perform maximized error detection and maximized error correction on the data in the subsequent data reading process. The error detection capability and the error correction capability of the processing system are improved.

In another possible implementation, the method further includes: obtaining the second error distribution area information of the at least one memory space in the plurality of memory spaces.

In this implementation, the processing system obtains the second error distribution area information, so that the processing system re-encodes and writes the data, to change an arrangement manner of a content space occupied by the data symbol, and the processing system can perform maximized error detection and maximized error correction on the data in the subsequent data reading process.

In another possible implementation, the obtaining the second error distribution area information of the at least one memory space in the plurality of memory spaces includes: determining the second error distribution area information of the at least one memory space in the plurality of memory spaces based on a historical data error.

In this implementation, the processing system may determine the second error distribution area information with reference to the historical data error. In other words, the processing system may dynamically change an error distribution area of the at least one memory space with reference to an actual situation. Therefore, the solution is more applicable to an actual scenario, and practicability of the solution is improved.

In another possible implementation, the data symbol and the first redundant symbol are Reed-Solomon (RS) code symbols; or the data symbol and the first redundant symbol are Bose-Chaudhuri-Hocquenghem (BCH) code symbols.

In this implementation, some possible forms of the data symbol and the first redundant symbol are provided, and are specifically determined based on an encoding algorithm used for the processing system, to facilitate implementation of the solution.

In another possible implementation, the performing first ECC encoding on the M data symbols to obtain N first redundant symbols includes: performing first ECC encoding on the M data symbols by using a finite field encoding algorithm to obtain the N first redundant symbols, where the finite field encoding algorithm includes an RS algorithm, a BCH algorithm, or the like.

In this implementation, the processing system may perform ECC encoding on the M data symbols by using the finite field encoding algorithm, to implement ECC protection on the data. This facilitates the processing system to perform maximized error correction and maximized error detection on the data subsequently. The error detection capability and the error correction capability of the processing system are improved.

In another possible implementation, the first memory is a memory that supports second ECC encoding, and the first memory further includes a second ECC memory space; and the method includes: performing second ECC encoding on the M data symbols and the N first redundant symbols as data to obtain R second redundant symbols, where each of the R second redundant symbols includes at least one redundant bit, and R is an integer greater than or equal to 1; and writing the M data symbols into the data memory space, writing the N first redundant symbols into the first ECC memory space, and writing the R second redundant symbols into the second ECC memory space.

In this implementation, the first memory further includes the second ECC memory space, and the processing system may further perform second ECC encoding on the M data symbols and the N first redundant symbols. Therefore, further second-level ECC protection is implemented for the M data symbols and the N first redundant symbols.

In another possible implementation, the first memory is an on-die error correction code (ECC) memory.

In this implementation, the first memory may be the on-die ECC memory. In this way, in the subsequent data reading process, a data bit read by the processing system may be obtained through error detection and error correction processing performed by the on-die ECC memory. In other words, in the technical solutions, the first ECC memory space and an on-die ECC memory space of the first memory can jointly perform error detection and error correction on the data. The error detection capability and the error correction capability of the processing system are improved, and the system reliability is improved.

A second aspect provides a processing system. The processing system includes a first memory, the first memory includes a plurality of memory spaces, and the processing system includes: an obtaining unit configured to obtain first data, where the first data is data to be written into the first memory; a determining unit configured to: determine, based on first error distribution area information of at least one memory space in the plurality of memory spaces, a first arrangement manner of a memory space occupied by a data symbol; and determine the first data as M data symbols based on the first arrangement manner of the memory space occupied by the data symbol, where each of the M data symbols includes a plurality of data bits, and M is an integer greater than or equal to 1; an encoding unit configured to perform first ECC encoding on the M data symbols to obtain N first redundant symbols, where each of the N first redundant symbols includes at least one redundant bit, and N is an integer greater than or equal to 1; and a writing unit configured to write the M data symbols and the N first redundant symbols into the first memory.

In a possible implementation, the first error distribution area information of the at least one memory space indicates a specific area, in the at least one memory space, in which an error data bit falls when a data error occurs in the at least one memory space.

In another possible implementation, each data symbol occupies an 8-bit memory space, and the first arrangement manner of the memory space occupied by the data symbol includes any one of the following: arrangement in four rows and two columns, arrangement in two rows and four columns, arrangement in eight rows and one column, and arrangement in one row and eight columns; or each data symbol occupies a 16-bit memory space, and the first arrangement manner of the memory space occupied by the data symbol includes any one of the following: arrangement in four rows and four columns, arrangement in eight rows and two columns, arrangement in two rows and eight columns, and arrangement in 16 rows and one column; or each data symbol occupies a 32-bit memory space, and the first arrangement manner of the memory space occupied by the data symbol includes any one of the following: arrangement in one row and 32 columns, arrangement in 32 rows and one column, arrangement in two rows and 16 columns, arrangement in 16 rows and two columns, arrangement in four rows and eight columns, and arrangement in eight rows and four columns.

In another possible implementation, the obtaining unit is further configured to: obtain the first error distribution area information of the at least one memory space in the plurality of memory spaces.

In another possible implementation, the processing system further includes a reading unit.

The reading unit is configured to read all data from the first memory, where all the data includes data bits and a redundant bit.

The determining unit is further configured to: determine, based on second error distribution area information of the at least one memory space in the plurality of memory spaces, a second arrangement manner of the memory space occupied by the data symbol; and determine the data bits in all the data as P data symbols based on the second arrangement manner of the memory space occupied by the data symbol, where each of the P data symbols includes a plurality of data bits, and P is an integer greater than or equal to 1.

The encoding unit is further configured to: perform first ECC encoding on the P data symbols to obtain Q first redundant symbols, where each of the Q first redundant symbols includes at least one redundant bit, and Q is an integer greater than or equal to 1.

The writing unit is further configured to: write the P data symbols and the Q first redundant symbols into the first memory.

In another possible implementation, the obtaining unit is further configured to: obtain the second error distribution area information of the at least one memory space in the plurality of memory spaces.

In another possible implementation, the obtaining unit is further configured to: determine the second error distribution area information of the at least one memory space in the plurality of memory spaces based on a historical data error.

In another possible implementation, the data symbol and the first redundant symbol are RS code symbols; or the data symbol and the first redundant symbol are BCH code symbols.

In another possible implementation, the encoding unit is further configured to: perform first ECC encoding on the M data symbols by using a finite field encoding algorithm to obtain the N first redundant symbols, where the finite field encoding algorithm includes an RS algorithm, a BCH algorithm, or the like.

In another possible implementation, the first memory is a memory that supports second ECC encoding, and the first memory further includes a second ECC memory space; and the encoding unit is further configured to: perform second ECC encoding on the M data symbols and the N first redundant symbols as data to obtain R second redundant symbols, where each of the R second redundant symbols includes at least one redundant bit, and R is an integer greater than or equal to 1.

The writing unit is further configured to: write the M data symbols into a data memory space, write the N first redundant symbols into a first ECC memory space, and write the R second redundant symbols into the second ECC memory space.

In another possible implementation, the first memory is an on-die ECC memory.

A third aspect provides a processing system. The processing system includes a first memory and a first memory controller, the first memory includes a plurality of memory spaces, and the first memory controller is configured to perform the following solutions: obtaining first data, where the first data is data to be written into a first memory; determining, based on first error distribution area information of at least one memory space in a plurality of memory spaces, a first arrangement manner of a memory space occupied by a data symbol; determining the first data as M data symbols based on the first arrangement manner of the memory space occupied by the data symbol, where each of the M data symbols includes a plurality of data bits, and M is an integer greater than or equal to 1; performing first ECC encoding on the M data symbols to obtain N first redundant symbols, where each of the N first redundant symbols includes at least one redundant bit, and N is an integer greater than or equal to 1; and writing the M data symbols into a data memory space of the first memory, and writing the N first redundant symbols into a first ECC memory space of the first memory.

In a possible implementation, the first error distribution area information of the at least one memory space indicates a specific area, in the at least one memory space, in which an error data bit falls when a data error occurs in the at least one memory space.

In another possible implementation, each data symbol occupies an 8-bit memory space, and the first arrangement manner of the memory space occupied by the data symbol includes any one of the following: arrangement in four rows and two columns, arrangement in two rows and four columns, arrangement in eight rows and one column, and arrangement in one row and eight columns; or each data symbol occupies a 16-bit memory space, and the first arrangement manner of the memory space occupied by the data symbol includes any one of the following: arrangement in four rows and four columns, arrangement in eight rows and two columns, arrangement in two rows and eight columns, and arrangement in 16 rows and one column; or each data symbol occupies a 32-bit memory space, and the first arrangement manner of the memory space occupied by the data symbol includes any one of the following: arrangement in one row and 32 columns, arrangement in 32 rows and one column, arrangement in two rows and 16 columns, arrangement in 16 rows and two columns, arrangement in four rows and eight columns, and arrangement in eight rows and four columns.

In another possible implementation, the first memory controller is configured to: obtain the first error distribution area information of the at least one memory space in the plurality of memory spaces.

In another possible implementation, the first memory controller is further configured to: read all the data from the first memory, where all the data includes the data bits and the redundant bit; determine, based on second error distribution area information of the at least one memory space in the plurality of memory spaces, a second arrangement manner of the memory space occupied by the data symbol; and determine the data bits in all the data as P data symbols based on the second arrangement manner of the memory space occupied by the data symbol, where each of the P data symbols includes a plurality of data bits, and P is an integer greater than or equal to 1; perform first ECC encoding on the P data symbols to obtain Q first redundant symbols, where each of the Q first redundant symbols includes at least one redundant bit, and Q is an integer greater than or equal to 1; and write the P data symbols into the data memory space of the first memory, and write the Q first redundant symbols into the first ECC memory space of the first memory.

In another possible implementation, the first memory controller is further configured to: obtain the second error distribution area information of the at least one memory space in the plurality of memory spaces.

In another possible implementation, the first memory controller is further configured to: determine the second error distribution area information of the at least one memory space in the plurality of memory spaces based on a historical data error.

In another possible implementation, the data symbol and the first redundant symbol are RS code symbols; or the data symbol and the first redundant symbol are BCH code symbols.

In another possible implementation, the first memory controller is further configured to: perform first ECC encoding on the M data symbols by using a finite field encoding algorithm to obtain the N first redundant symbols, where the finite field encoding algorithm includes an RS algorithm, a BCH algorithm, or the like.

In another possible implementation, the first memory is a memory that supports second ECC encoding, and the first memory further includes a second ECC memory space.

The first memory controller is further configured to: perform second ECC encoding on the M data symbols and the N first redundant symbols as data to obtain R second redundant symbols, where each of the R second redundant symbols includes at least one redundant bit, and R is an integer greater than or equal to 1; and write the M data symbols into the data memory space, write the N first redundant symbols into the first ECC memory space, and write the R second redundant symbols into the second ECC memory space.

In another possible implementation, the first memory is a memory that supports the second ECC encoding, and the first memory further includes the second ECC memory space; and the processing system further includes a second memory controller.

The second memory controller is configured to: perform second ECC encoding on the M data symbols and the N first redundant symbols as data to obtain R second redundant symbols, where each of the R second redundant symbols includes at least one redundant bit, and R is an integer greater than or equal to 1; and write the M data symbols into the data memory space, write the N first redundant symbols into the first ECC memory space, and write the R second redundant symbols into the second ECC memory space.

In another possible implementation, the first memory is an on-die ECC memory.

A fourth aspect provides a processing system. The processing system includes a processor, a storage, and an input/output interface. The processor and the storage are connected to the input/output interface. The storage is configured to store program code. The processor invokes the program code in the storage to perform the method shown in the first aspect.

A fifth aspect provides a storage medium, including computer instructions. When the computer instructions are run on a computer, the computer instructions are configured to execute a program designed for the processing system in the first aspect.

A sixth aspect provides a computer program product including instructions. When the computer program product runs on a computer, the computer is enabled to perform the method according to any of the optional implementations of the first aspect.

According to the foregoing technical solutions, it can be learned that embodiments have the following advantages:

It can be learned from the foregoing technical solutions that this disclosure provides a data writing method. The method is applied to the processing system, the processing system includes the first memory, and the first memory includes the plurality of memory spaces. The method includes: obtaining the first data, where the first data is the data to be written into the first memory; determining, based on the first error distribution area information of the at least one memory space in the plurality of memory spaces, the first arrangement manner of the memory space occupied by the data symbol; determining the first data as the M data symbols based on the first arrangement manner of the memory space occupied by the data symbol, where each of the M data symbols includes the plurality of data bits, and M is the integer greater than or equal to 1; then performing first ECC encoding on the M data symbols to obtain the N first redundant symbols, where each of the N first redundant symbols includes the at least one redundant bit, and N is the integer greater than or equal to 1; and writing the M data symbols into the data memory space of the first memory, and writing the N first redundant symbols into the first ECC memory space of the first memory. It can be learned that the processing system determines, based on the first error distribution area information of the at least one memory space in the plurality of memory spaces, the first arrangement manner of the memory space occupied by the data symbol. In other words, the processing system designs, with reference to the distribution of the error areas in the at least one memory space, the arrangement manner of the memory space occupied by the data symbol. Then, the processing system determines the first data as the M data symbols with reference to the first arrangement manner of the memory space occupied by the data symbol, where each of the M data symbols includes the data bits. Because the destination addresses of the data bits in the first data are known, the processing system divides, with reference to the first arrangement manner, the data bits that are in the first data and that can form the shape of the first arrangement manner into a same data symbol. Therefore, this helps perform maximized error detection and maximized error correction on the data in the subsequent data reading process of the processing system, and the system reliability is improved. In this way, the maximized error detection capability and the maximized error correction capability of the ECC memory space of the first memory are fully utilized, the data error area is covered to the maximum extent, and the system reliability is improved.

DETAILED DESCRIPTION

Embodiments provide a data writing method and a processing system, to improve an error detection capability and an error correction capability of the processing system, and improve system reliability.

The following clearly describes the technical solutions with reference to the accompanying drawings. It is clear that the described embodiments are merely some but not all of embodiments. All other embodiments obtained by persons skilled in the art based on embodiments of this disclosure without creative efforts shall fall within the protection scope of this disclosure.

Reference to "an embodiment", "some embodiments", or the like indicates that one or more embodiments include a specific feature, structure, or characteristic described with reference to embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "comprise", "have", and their variants all mean "include but are not limited to", unless otherwise specifically emphasized in another manner.

Unless otherwise specified, "/" means "or". For example, A/B may indicate A or B. A term "and/or" in this specification describes only an association relationship between associated objects and indicates that there may be three relationships. For example, A and/or B may represent the following three cases: Only A exists, both A and B exist, and only B exists. In addition, "at least one" means one or more, and "a plurality of" means two or more. "At least one of the following items (pieces)" or a similar expression thereof indicates any combination of these items, including a single item (piece) or any combination of a plurality of items (pieces). For example, at least one of a, b, or c may represent a, b, c, a and b, a and c, b and c, or a, b, and c. a, b, and c each may be singular or plural.

The following describes some technical terms.

A cache line is a size of a piece of data cached by a cache module (cache unit) in a processor. The size of the cache line varies based on the processor. Currently, the size of the cache line in a mainstream computer and server is 64 bytes. Generally, data that can be cached in the processor is moved in the same size as 64 bytes.

Figure 1:
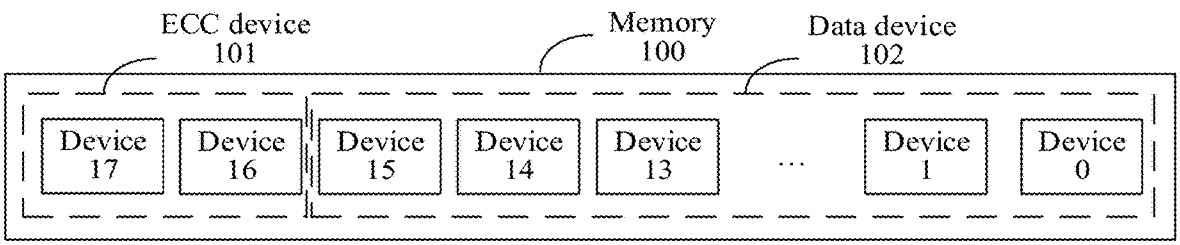
FIG. 1 is a schematic diagram of a memory according to an embodiment.

A memory device is a core component of a memory module. The memory device is a storage medium of a memory and directly affects memory performance. FIG. 1 is a schematic diagram of a memory according to an embodiment. It can be seen from FIG. 1 that the memory 100 includes one or more memory devices. According to different content stored in the memory devices, the memory devices are further classified into a data device 102 and an ECC device 101. Specifications of the memory devices usually include an X4 device, an X8 device, and an X16 device. X4, X8, and X16 indicate that external data lines of each memory device are 4DQ, 8DQ, and 16DQ respectively. One DQ corresponds to one pin on a physical dual-inline memory module (DIMM). The DQ can be translated into a data transmission signal (data strobe signal).

On-die ECC memory: The on-die error correction code is supported. To be specific, a data bit in the on-die ECC memory may be encoded in the on-die ECC memory by using an ECC algorithm, to obtain an on-die ECC bit. The on-die ECC bit is invisible to a central processing unit. Generally, the ECC algorithm used in the on-die ECC memory is usually simple.

The technical solutions provided may be applied to a processing system. The processing system includes a first memory, and the first memory includes a plurality of memory spaces. The processing system is a collection of a plurality of pieces of hardware and software. The processing system may be a storage system, and the processing system may be integrated into a node device or a server.

Figure 2A:
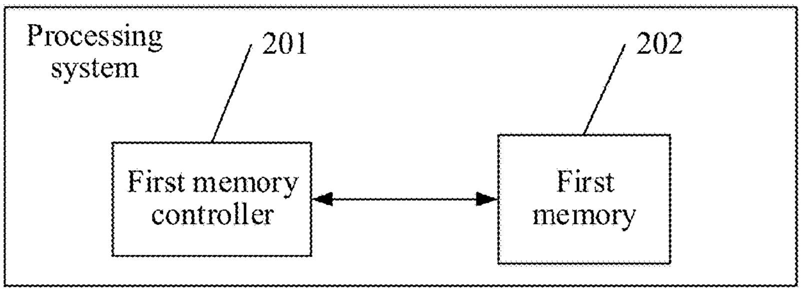
FIG. 2A is a schematic diagram of a processing system according to an embodiment.
Figure 2B:
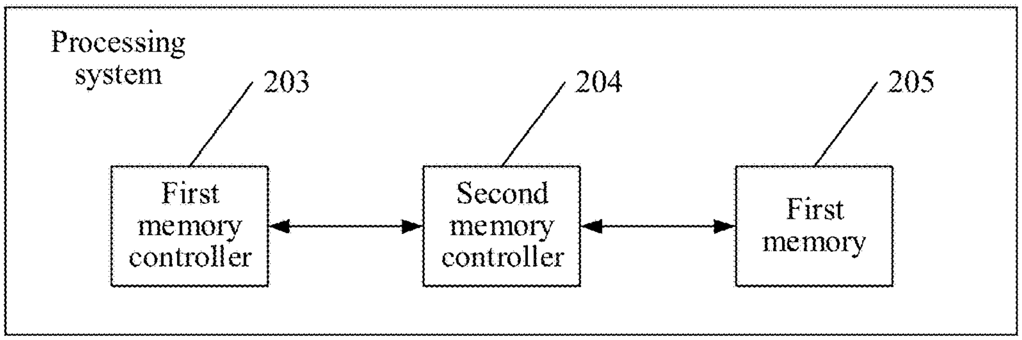
FIG. 2B is another schematic diagram of a processing system according to an embodiment.

The following describes two possible schematic diagrams of a processing system with reference to FIGS. 2A and 2B.

FIG. 2A is a schematic diagram of a processing system according to an embodiment. The processing system includes a first memory controller 201 and a first memory 202. The first memory controller 201 is connected to the first memory 202. The first memory controller 201 has a function of first ECC encoding. For related descriptions of first ECC coding, refer to detailed descriptions in the following embodiments.

Optionally, the first memory controller 201 further has a function of second ECC encoding, to perform second ECC encoding on a redundant bit obtained through the first ECC encoding and a data bit to be written into the first memory 202. For related descriptions of second ECC decoding, refer to detailed descriptions in the following embodiments. In other words, in an architecture shown in FIG. 2A, the first memory controller has both the function of the first ECC encoding and the function of the second ECC encoding. In this way, multi-level ECC protection can be implemented for data.

Optionally, the first memory controller 201 may be integrated into a central processing unit (CPU). A provide data writing method may be performed by the first memory controller 201.

FIG. 2B is another schematic diagram of a processing system according to an embodiment. The processing system includes a first memory controller 203, a second memory controller 204, and a first memory 205. The first memory controller 203 is connected to one side of the second memory controller 204, and the other side of the second memory controller 204 is connected to the first memory 205.

The first memory controller 203 has a function of first ECC encoding. For related descriptions of first ECC decoding, refer to detailed descriptions in the following embodiments. The second memory controller 204 has a function of second ECC encoding, to perform second ECC encoding on a redundant bit obtained through the first ECC encoding and a data bit to be written into the first memory 205. For related descriptions of second ECC decoding, refer to detailed descriptions in the following embodiments. The data writing method may be performed by the first memory controller 203 and the second memory controller 204.

The following describes some possible deployment manners of the first memory controller 203 and the second memory controller 204.

1. The first memory controller 203 may be integrated into a central processing unit, and the second memory controller 204 may be integrated into the first memory 205.
2. Both the first memory controller 203 and the second memory controller 204 are integrated in a central processing unit.
3. Both the first memory controller 203 and the second memory controller 204 are integrated into the first memory 205.

The processing systems shown in FIGS. 2A and 2B are merely intended to describe a system architecture to which embodiments are applied, and do not limit the system architecture to which embodiments are applied. For example, the provided data writing method is alternatively applicable to a chip system, and a data writing process is performed in the chip system.

The processing systems shown in FIGS. 2A and 2B are merely examples. In actual application, the processing system may further include more memory controllers and more memories.

Currently, in a computer system, a requirement for high reliability is more evident. A technology trend is that media vendors support an on-die ECC technology. However, an on-die ECC memory has a significant problem. Due to cost and resource limitations, an ECC algorithm used in the on-die ECC memory is usually simple. For example, the on-die ECC memory usually performs ECC encoding on 128 bits by using Hamming code, so that one error bit can be corrected and two error bits can be detected.

As specifications of a DDR3 device, a DDR4 device, a DDR5 device, and a DDR6 device increase, an advanced manufacturing process decreases. A voltage of a DDR decreases, and an amount of charge that a capacitor of each storage unit can hold decreases. As a result, a transient error or a soft error easily occurs. A trend is that a transient error causes an increase in a probability of a multi-bit error. Therefore, how the memory controller performs ECC encoding on the data to improve a data error correction capability when a data error occurs is an urgent problem to be resolved currently.

The foregoing uses the on-die ECC memory as an example to describe the problem to be resolved. In actual application, the technical solutions may alternatively be applied to a data writing process of another type of memory. This is not specifically limited. For example, the technical solutions may alternatively be applied to a common memory (to be specific, a memory that supports the first ECC encoding, where data is protected by first-level ECC) or a memory that supports multi-level ECC encoding (for example, a memory that supports the first ECC encoding and the second ECC encoding, where data is protected by first-level ECC and second-level ECC). For the first ECC encoding and the second ECC encoding, refer to related descriptions in the following.

For ease of understanding, the following describes the technical solutions with reference to specific embodiments.

Figure 3:
FIG. 3 is a schematic diagram of an embodiment of a data writing method according to an embodiment.

FIG. 3 is a schematic diagram of an embodiment of a data writing method according to an embodiment. Refer to FIG. 3. The method includes the following steps.

301: Obtain first data, where the first data is data to be written into a first memory.

The provided data writing method is applied to a processing system. The processing system includes a first memory, and the first memory includes a plurality of memory spaces.

Optionally, in the plurality of memory spaces of the first memory, each memory space has a size of one memory device or is of another size.

Optionally, sizes of different memory spaces of the first memory may be the same or different. The following describes the technical solutions by using an example in which each memory space of the first memory has the size of one memory device.

Optionally, each memory space of the first memory may be used as a data memory space and/or an ECC memory space.

Figure 4:
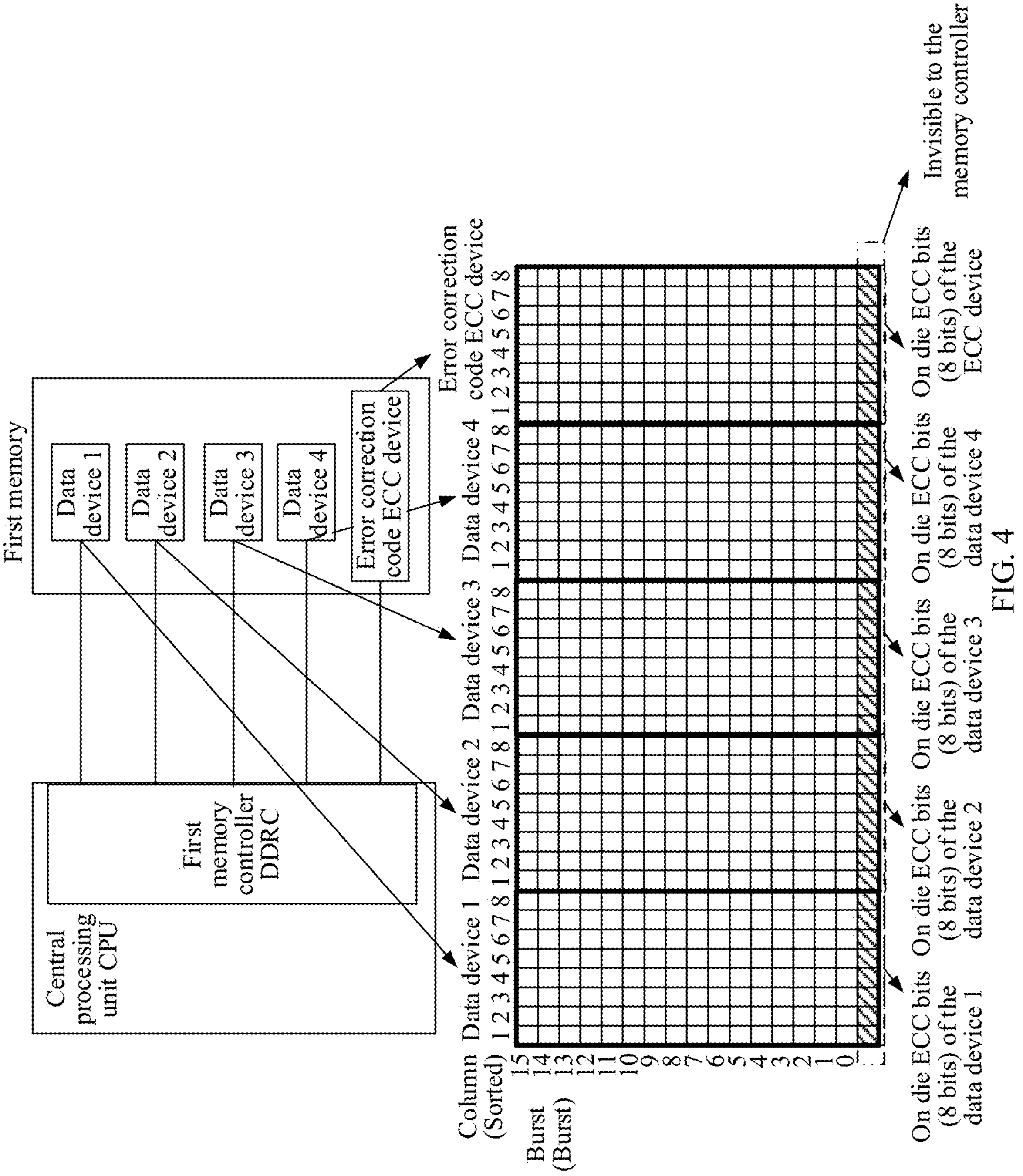
FIG. 4 is a schematic diagram of a first memory according to an embodiment.

For example, as shown in FIG. 4, the first memory includes a data device 1 to a data device 4 and an ECC device. In other words, it may be understood that the first memory includes five memory spaces, and each memory space has the size of one memory device.

For example, the processing system caches the first data, and a size of the first data is 64 bytes, that is, 512 bits.

Optionally, a type of the first memory is a DDR3, a DDR4, a DDR5, a DDR6, a high-bandwidth memory (HBM), a lower-power double data rate synchronous dynamic random-access memory (LPDDR), a memory that is not in a Joint Electron Device Engineering Council (JEDEC) standard, or the like.

The first memory may be a common memory (to be specific, a memory that supports first-level ECC encoding), or may be a memory that supports multi-level ECC encoding (for example, the first memory is a memory that supports first ECC encoding and second ECC encoding), or may be a memory of another type. For the first ECC encoding and the second ECC encoding, refer to related descriptions in the following.

For example, the first memory is an on-die ECC memory. For example, as shown in FIG. 4, each memory device in the first memory is an on-die ECC memory. The ECC device in the first memory is configured to perform first-level ECC protection on data, and an on-die ECC bit in each memory device may implement second-level ECC protection on the data.

302: Determine, based on first error distribution area information of at least one memory space in the plurality of memory spaces, a first arrangement manner of a memory space occupied by a data symbol.

The first error distribution area information of the at least one memory space in the plurality of memory spaces indicates a specific area, in the at least one memory space, in which an error data bit falls when a data error occurs in the at least one memory space. A size of an area indicated by the first error distribution area information is less than a size of the at least one memory space.

Optionally, the first memory includes the plurality of memory spaces, and areas in which data errors occur in different memory spaces in the plurality of memory spaces may be the same or may be different.

For example, if the areas in which the data errors occur in all of the plurality of memory spaces are the same, the processing system may obtain first error distribution area information of any one of the plurality of memory spaces. Then, the processing system may determine, with reference to the first error distribution area information of the any one memory space, the first arrangement manner of the memory space occupied by the data symbol.

For example, the memory spaces include data memory spaces and a first ECC memory space. An area in which a data error occurs in the data memory space is different from an area in which a data error occurs in the first ECC memory space. Areas in which data errors occur in different data memory spaces are the same. In this case, the processing system obtains first error distribution area information of any data memory of the first memory. Then, the processing system may determine, with reference to the first error distribution area information of the any data memory, the first arrangement manner of the memory space occupied by the data symbol.

For example, the memory spaces include data memory spaces and a first ECC memory space. Areas in which data errors occur in different data memory spaces are different. In this case, the processing system obtains first error distribution area information corresponding to one or more data memory spaces included in the plurality of memory spaces. Then, with reference to the first error distribution area information corresponding to the one or more data memory spaces included in the plurality of memory spaces, the processing system may determine the first arrangement manner of the memory space occupied by the data symbol.

The following describes the technical solutions by using an example in which the areas in which the data errors occur in all of the plurality of memory spaces are the same.

For example, as shown in FIG. 4, the first memory includes the data device 1 to the data device 4 and the ECC device. In other words, it may be understood that the first memory includes the five memory spaces, and each memory space has the size of one memory device. For example, when a data error occurs in a memory device, a specific area in which an error data bit falls in a memory space is an area in which a data error occurs, as shown in FIG. 5A or 5B, to be specific, a ½ memory space of the memory device starting from the left or a ½ memory space of the memory device starting from the top.

Figure 5A:
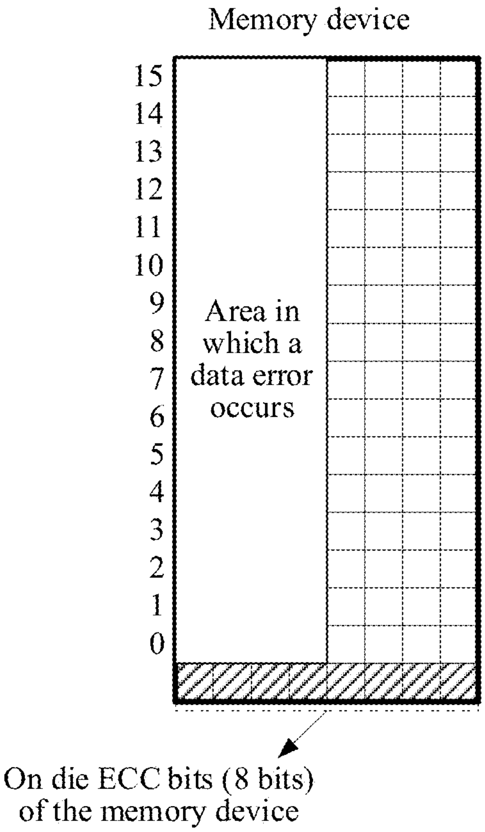
FIG. 5A is a schematic diagram of an area in which a data error occurs in a memory device according to an embodiment.
Figure 5B:
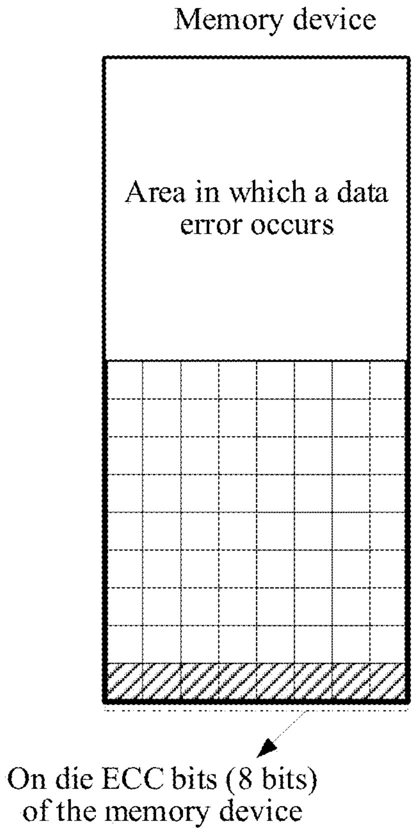
FIG. 5B is another schematic diagram of an area in which a data error occurs in a memory device according to an embodiment.

FIGS. 5A and 5B are merely examples. In actual application, when a data error occurs in a memory device, a specific area in which an error data bit falls in the memory device includes a ¼ or ⅛ memory space of the memory device starting from the left. Alternatively, when a data error occurs in a memory device, a specific area in which an error data bit falls in the memory device includes a ¼ memory space of the memory device starting from the top.

Specifically, the processing system determines, based on the first error distribution area information of the at least one memory space in the plurality of memory spaces, the first arrangement manner of the memory space occupied by the data symbol.

The first arrangement manner of the memory space occupied by the data symbol matches an arrangement manner of the area indicated by the first error distribution area information. In other words, the first arrangement manner of the memory space occupied by the data symbol is strongly associated with the arrangement manner of the area indicated by the first error distribution area information.

Optionally, the symbol may be an RS code symbol or a BCH code symbol. Specifically, it should be determined with reference to an encoding algorithm used for the processing system in the subsequent step 304. For example, if the processing system performs first ECC encoding on the first data by using an RS algorithm, the symbol in this specification is the RS code symbol. For example, if the processing system performs first ECC encoding on the first data by using a BCH algorithm, the symbol in this specification is the BCH code symbol.

Optionally, each data symbol occupies an 8-bit memory space, and the first arrangement manner of the memory space occupied by the data symbol includes any one of the following: arrangement in four rows and two columns, arrangement in two rows and four columns, arrangement in eight rows and one column, and arrangement in one row and eight columns.

Optionally, each data symbol occupies a 16-bit memory space, and the first arrangement manner of the memory space occupied by the data symbol includes any one of the following: arrangement in four rows and four columns, arrangement in eight rows and two columns, arrangement in two rows and eight columns, and arrangement in 16 rows and one column.

Optionally, each data symbol occupies a 32-bit memory space, and the first arrangement manner of the memory space occupied by the data symbol includes any one of the following: arrangement in one row and 32 columns, arrangement in 32 rows and one column, arrangement in two rows and 16 columns, arrangement in 16 rows and two columns, arrangement in four rows and eight columns, and arrangement in eight rows and four columns.

The following describes some possible arrangement manners by using an example in which each data symbol occupies the 16-bit memory space.

Figure 6A:
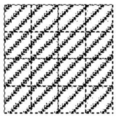
FIG. 6A is a schematic diagram of an arrangement manner of a memory space occupied by a data symbol according to an embodiment.

For example, as shown in FIG. 6A, each data symbol occupies the 16-bit memory space, and a specific arrangement manner is the arrangement in the four rows and the four columns.

Figure 6B:
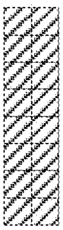
FIG. 6B is another schematic diagram of an arrangement manner of a memory space occupied by a data symbol according to an embodiment.

For example, as shown in FIG. 6B, each data symbol occupies the 16-bit memory space, and a specific arrangement manner is the arrangement in the eight rows and the two columns.

Figure 6C:
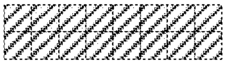
FIG. 6C is another schematic diagram of an arrangement manner of a memory space occupied by a data symbol according to an embodiment.

For example, as shown in FIG. 6C, each data symbol occupies the 16-bit memory space, and a specific arrangement manner is the arrangement in the two rows and the eight columns.

Figure 6D:
FIG. 6D is another schematic diagram of an arrangement manner of a memory space occupied by a data symbol according to an embodiment.

For example, as shown in FIG. 6D, each data symbol occupies the 16-bit memory space, and a specific arrangement manner is the arrangement in the 16 rows and the one column.

The following describes some examples of determining, by the processing system with reference to the first error distribution area information of the at least one memory space in the plurality of memory spaces, the first arrangement manner of the memory space occupied by the data symbol.

For example, each data symbol occupies the 16-bit memory space. In a case of an arrangement manner of the area in which the data error occurs shown in FIG. 5A, the processing system may set the first arrangement manner of the memory space occupied by the data symbol to the arrangement manner shown in FIG. 6A or 6D.

The processing system may separately determine that the arrangement manner shown in FIG. 6A is the arrangement in the four rows and the four columns. The four rows are four consecutive rows. If data bit errors occur and are distributed in different memory devices, the processing system cannot maximize error correction on the data bits. For a specific example, refer to related descriptions in the following. Therefore, based on a scenario shown in FIG. 5A, the processing system may determine that the first arrangement manner is the arrangement manner shown in FIG. 6D.

For example, each data symbol occupies the 16-bit memory space. In a case of an arrangement manner of the area in which the data error occurs shown in FIG. 5B, the processing system may set the first arrangement manner of the memory space occupied by the data symbol to the arrangement manner shown in FIG. 6B or 6C.

Optionally, the embodiment shown in FIG. 3 further includes step 302*a*. Step 302*a* may be performed before step 302.

302*a*: Obtain the first error distribution area information of the at least one memory space in the plurality of memory spaces.

Specifically, the processing system may obtain the first error distribution area information of the at least one memory space in the plurality of memory spaces.

Optionally, the processing system may receive, through an external interface, the first error distribution area information of the at least one memory space in the plurality of memory spaces provided by a vendor. Alternatively, the processing system may determine the first error distribution area information of the at least one memory space in the plurality of memory spaces by using a user specification.

In a possible implementation, the first memory is the common memory, and the first error distribution area information may include an estimated specific area, in the at least one memory space, in which the error data bit falls when the data error occurs in the at least one memory space.

In another possible implementation, the first memory is a memory that supports second ECC (for example, on-die ECC), and the first memory further includes a second ECC memory space. The first error distribution area information includes an error area detected in the second ECC memory space or an additional mis-correction area generated by performing error correction in the second ECC memory space.

In this implementation, optionally, the first error distribution area information may be determined by the vendor with reference to an encoding algorithm and a decoding algorithm used for the second ECC memory space (for example, an on-die ECC memory space).

For example, as shown in FIG. 4, the first memory is the on-die ECC memory. The first memory includes the data device 1 to the data device 4 and the ECC device. Each memory device is an on-die ECC memory. Each on-die ECC memory encodes, by using a Hamming code algorithm, data to be stored in the on-die ECC memory, to obtain an ECC bit in the on-die ECC memory. Generally, an error distribution area in a memory device may be: a ½ memory space of the memory device starting from the left, a ½ memory space of the memory device starting from the right, a ¼ memory space of the memory device starting from the left, a ¼ memory space of the memory device starting from the right, a ½ memory space starting from the top, a ½ memory space starting from the bottom, a memory space in an odd-numbered column, or a memory space in an even-numbered column.

303: Determine the first data as M data symbols based on the first arrangement manner of the memory space occupied by the data symbol.

Each of the M data symbols includes a plurality of data bits, and M is an integer greater than or equal to 1.

For example, the first data includes 512 bits, and one data symbol includes 16 bits. In this case, the processing system may determine the 512 bits as 32 data symbols based on the first arrangement manner of the memory space occupied by the data symbol.

Figure 9:
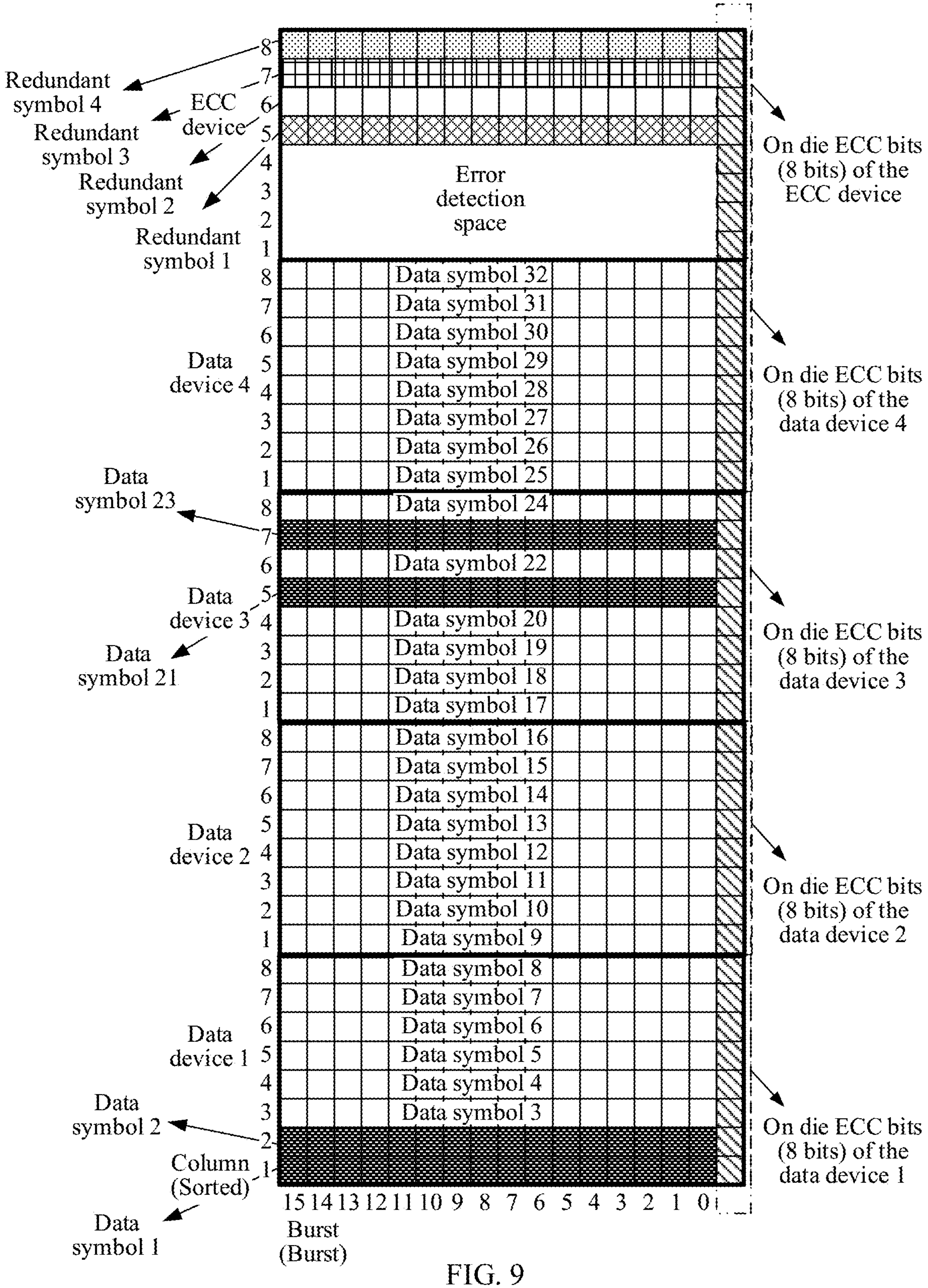
FIG. 9 is a schematic diagram of N data symbols and M first redundant symbols in a first memory according to an embodiment.

For example, the first arrangement manner of the memory space occupied by the data symbol is the arrangement manner shown in FIG. 6D, that is, the arrangement in the 16 rows and the one column. The processing system may determine the 512 bits as the 32 data symbols with reference to a destination memory address of a data bit in the first data and the first arrangement manner. For example, as shown in FIG. 9, the processing system uses, as a data bit included in a data symbol 1, a data bit that is in the first data and that is to be stored in a memory space of the first column in the data device 1. The processing system divides a data bit that is in the first data and that is to be stored in a memory space of the second column in the data device 1 into a data bit included in a data symbol 2. By analogy, the processing system divides a data bit that is in the first data and that is to be stored in a memory space of the last column in the data device 4 into a data bit included in a data symbol 32. It can be learned that each data symbol is arranged in the first arrangement manner.

Figure 10:
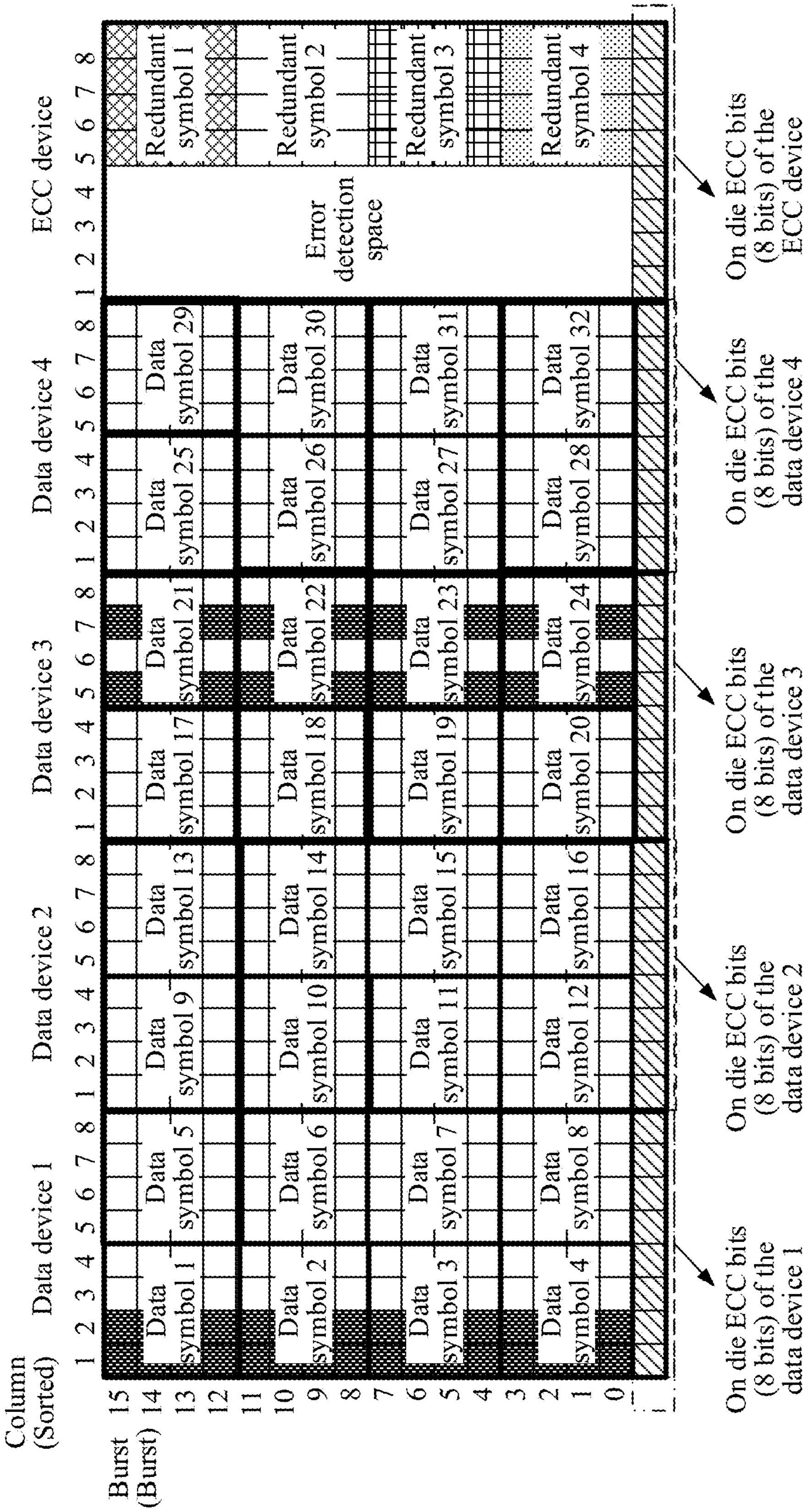
FIG. 10 is another schematic diagram of N data symbols and M first redundant symbols in a first memory according to an embodiment.

For example, the first arrangement manner of the memory space occupied by the data symbol is the arrangement manner shown in FIG. 6A, that is, the arrangement in the four rows and the four columns. The processing system may determine the 512 bits as the 32 data symbols with reference to the destination memory address of the data bit in the first data and the first arrangement manner. For example, as shown in FIG. 10, the processing system divides the 512 bits into a data symbol 1 to a data symbol 32 shown in FIG. 10 based on a memory space in which 512-bit data is to be stored. It can be learned that each data symbol is arranged in the first arrangement manner.

304: Perform first ECC encoding on the M data symbols to obtain N first redundant symbols.

Each of the N first redundant symbols includes at least one redundant bit.

Step 304 specifically includes: The processing system performs ECC encoding on the M data symbols by using a finite field encoding algorithm, to obtain the N first redundant symbols. For example, a finite field includes a Galois field (GF(p)). In other words, the first ECC encoding may include: The processing system performs ECC encoding on the M data symbols by using the finite field encoding algorithm.

For example, the finite field encoding algorithm includes an RS algorithm, a BCH algorithm, or the like, or may be another finite field encoding algorithm.

The N first redundant symbols include an error correction symbol. One error correction symbol may be used for correcting one data symbol. Optionally, the first redundant symbol includes an error detection symbol.

For example, the first data includes the 512 bits. The processing system forms a cache line by using 16 bursts data, and each memory device in the first memory is an X4 memory device. Therefore, it can be learned that the processing system may determine that a length of each codeword is 4 bits*16 bursts*10 devices=640 bits. It can be learned that the N first redundant symbols include 4 bits*16 bursts*2 devices=128 redundant bits. Optionally, an arrangement manner of a memory space occupied by the first redundant symbol may be the same as or different from the arrangement manner of the memory space occupied by the data symbol.

Optionally, the first ECC encoding may also be referred to as first-level ECC encoding.

Optionally, the processing system determines, based on first error distribution area information of the first ECC memory space of the first memory, the arrangement manner of the memory space occupied by the first redundant symbol. A specific determining process is similar to the foregoing process of determining the first arrangement manner by the processing system.

Optionally, the arrangement manner of the memory space occupied by the first redundant symbol may be the same as or different from the arrangement manner of the memory space occupied by the data symbol. This is not specifically limited in this application. For example, an error distribution area of the first ECC memory space of the first memory is the same as an error distribution area of the data memory space of the first memory, and the arrangement manner of the memory space occupied by the first redundant symbol may be the first arrangement manner. The following describes the technical solutions by using an example in which the arrangement manner of the memory space occupied by the first redundant symbol is the same as the arrangement manner of the memory space occupied by the data symbol.

The following describes an arrangement manner of the N first redundant symbols with reference to FIGS. 7A to 7D. The following FIGS. 7A to 7D are described by using an example in which a size of an error detection space and a size of an error correction space in the first ECC memory space of the first memory are 1:1. In other words, a ratio of an error correction symbol to an error detection symbol is 1:1. An arrangement manner of a memory space occupied by the error detection symbol may be the first arrangement manner. The error detection symbol is not described in detail in the following.

Figure 7A:
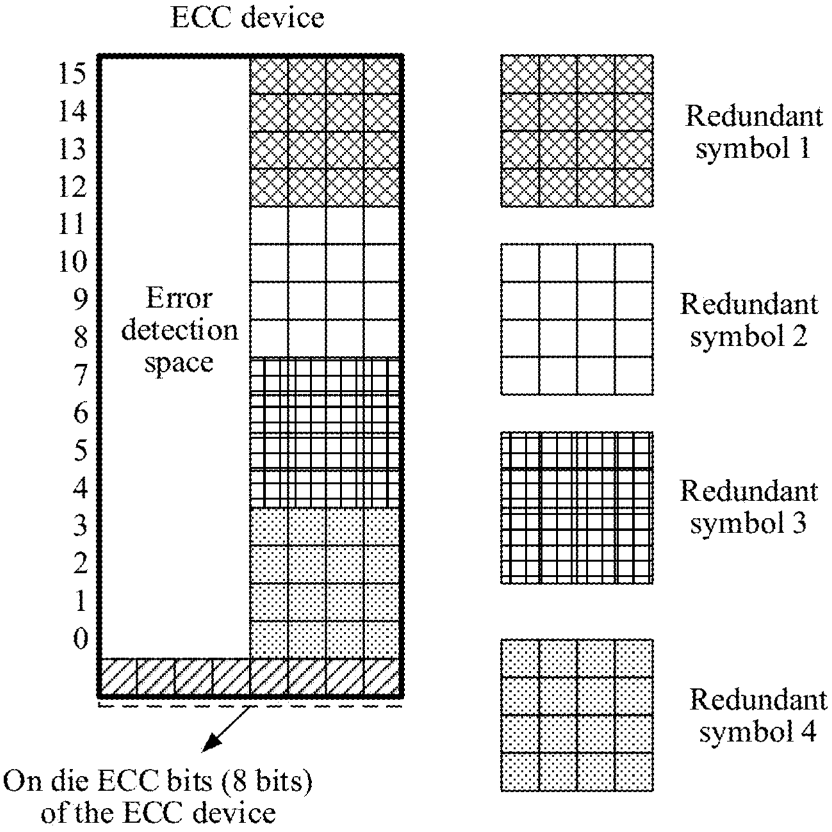
FIG. 7A is a schematic diagram of an arrangement manner of a memory space occupied by a first redundant symbol according to an embodiment.

For example, as shown in FIG. 7A, the N first redundant symbols include four error correction symbols, and the four error correction symbols are respectively represented as a first redundant symbol 1, a first redundant symbol 2, a first redundant symbol 3, and a first redundant symbol 4. An arrangement manner of a memory space occupied by each error correction symbol in these error correction symbols is the arrangement manner shown in FIG. 6A, that is, the arrangement in the four rows and the four columns.

Figure 7B:
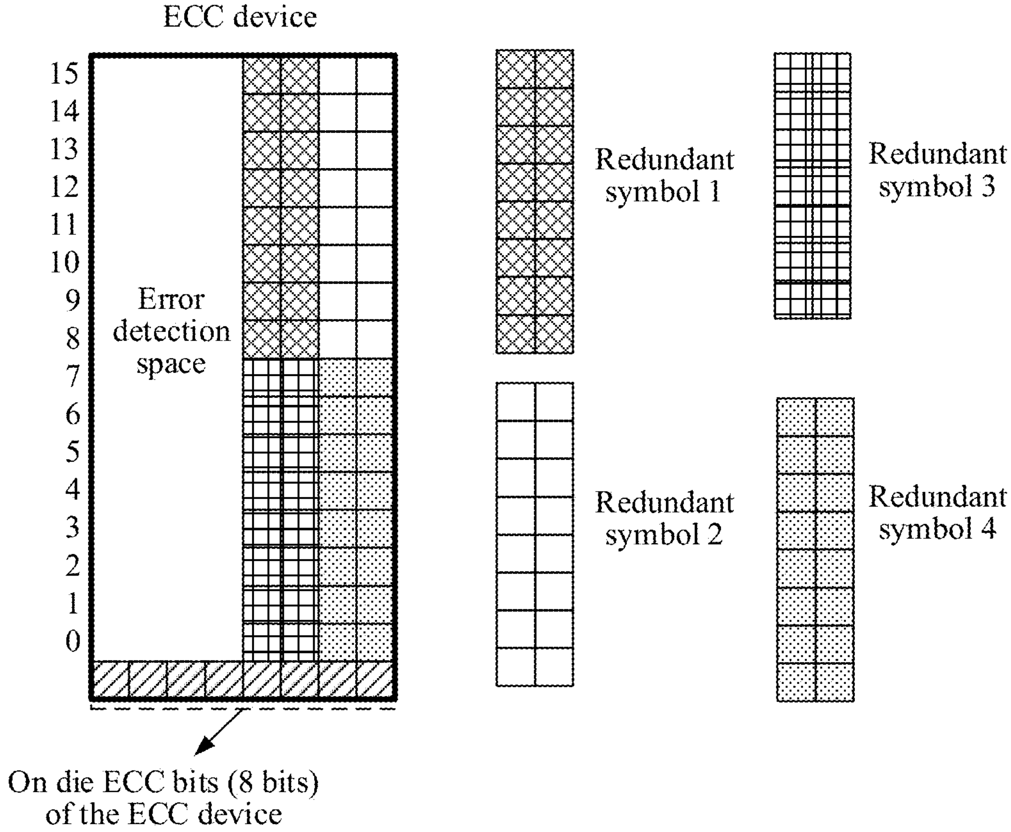
FIG. 7B is another schematic diagram of an arrangement manner of a memory space occupied by a first redundant symbol according to an embodiment.

For example, as shown in FIG. 7B, the N first redundant symbols include four error correction symbols, and the four error correction symbols are respectively represented as a first redundant symbol 1, a first redundant symbol 2, a first redundant symbol 3, and a first redundant symbol 4. An arrangement manner of a memory space occupied by each error correction symbol in these error correction symbols is the arrangement manner shown in FIG. 6B, that is, the arrangement in the eight rows and the two columns.

Figure 7C:
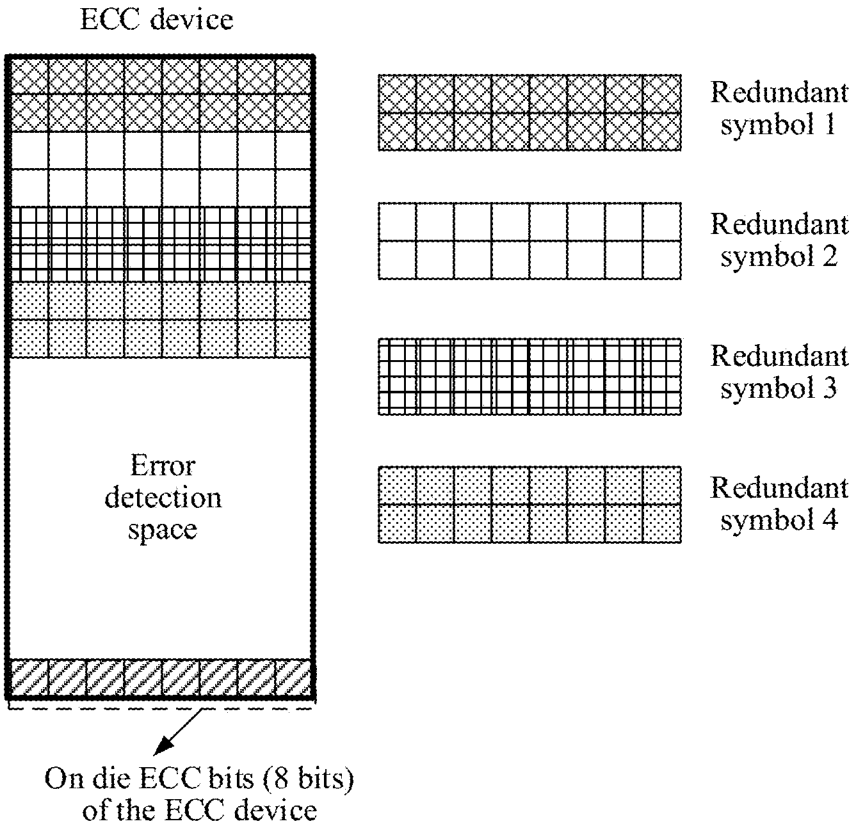
FIG. 7C is another schematic diagram of an arrangement manner of a memory space occupied by a first redundant symbol according to an embodiment.

For example, as shown in FIG. 7C, the N first redundant symbols include four error correction symbols, and the four error correction symbols are respectively represented as a first redundant symbol 1, a first redundant symbol 2, a first redundant symbol 3, and a first redundant symbol 4. An arrangement manner of a memory space occupied by each error correction symbol in these error correction symbols is the arrangement manner shown in FIG. 6C, that is, the arrangement in the two rows and the eight columns.

Figure 7D:
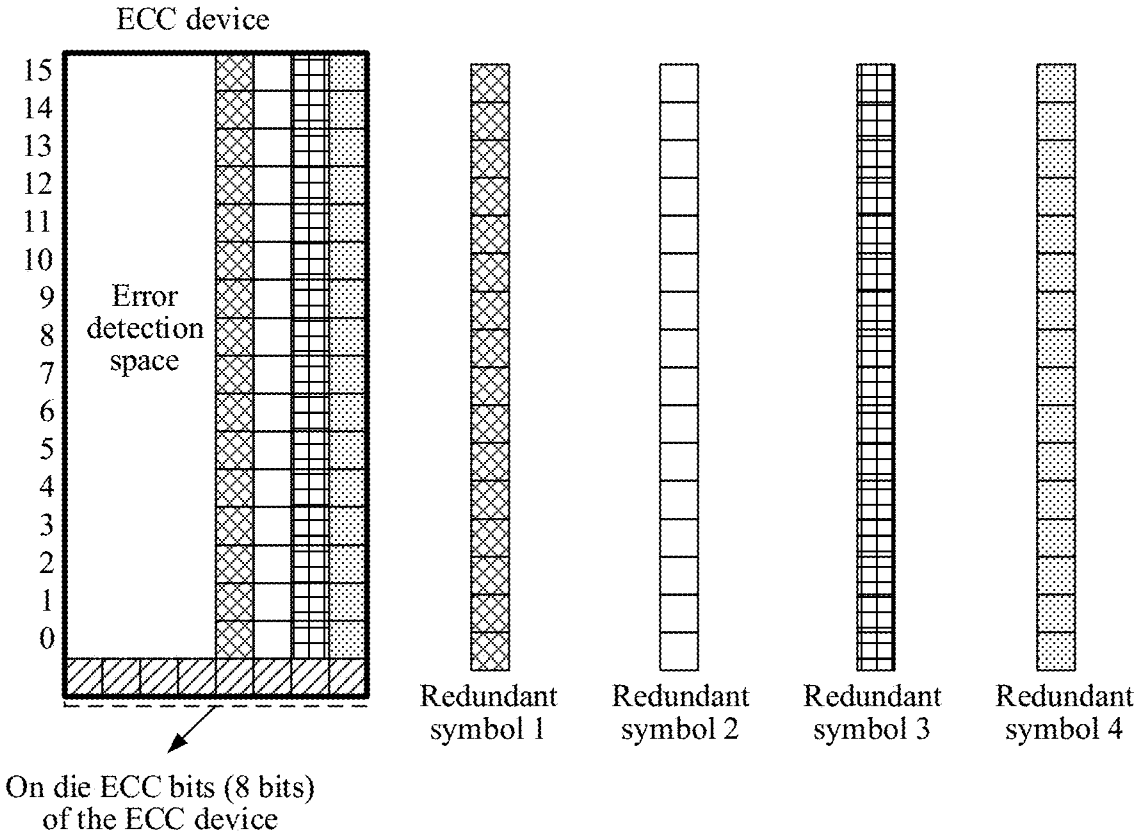
FIG. 7D is another schematic diagram of an arrangement manner of a memory space occupied by a first redundant symbol according to an embodiment.

For example, as shown in FIG. 7D, the N first redundant symbols include four error correction symbols, and the four error correction symbols are respectively represented as a first redundant symbol 1, a first redundant symbol 2, a first redundant symbol 3, and a first redundant symbol 4. An arrangement manner of a memory space occupied by each error correction symbol in these error correction symbols is the arrangement manner shown in FIG. 6D, that is, the arrangement in the 16 rows and the one column.

All codeword lengths used in the processing system in the foregoing example are 640 bits. In actual application, another length may alternatively be used as the codeword length. For example, a codeword length is 320 bits, and the processing system may perform encoding by using a plurality of codewords.

From a perspective of a design of a codeword, a larger quantity of rows indicates a larger quantity of bursts that need to be read in the first memory, and a longer delay. A time window for subsequent decoding and error correction is larger. Therefore, the processing system may alternatively use a small codeword to perform ECC encoding, to reduce a delay of the decoding and the error correction.

The first memory includes a plurality of memory devices, and each memory device may be considered as a memory storage medium that supports the second ECC encoding (for example, the on-die ECC). The foregoing describes the technical solutions by using an example in which one encoding codeword length in the second ECC memory space of each memory device includes 128 data bits and eight redundant bits (which may also be referred to as second ECC bits). In actual application, the encoding codeword length in the second ECC memory space of each memory device may be larger or smaller. For example, the encoding codeword length in the second ECC memory space of each memory device may include 256 data bits and 16 redundant bits. Alternatively, the encoding codeword length in the second ECC memory space of each memory device may include 512 data bits and 32 redundant bits. This is not specifically limited in this application. Optionally, the second ECC encoding may also be referred to as second-level ECC encoding.

305: Write the M data symbols into the data memory space of the first memory, and write the N first redundant symbols into the first ECC memory space of the first memory.

Specifically, the processing system writes the M data symbols into the data memory space of the first memory, and writes the N first redundant symbols into the first ECC memory space of the first memory.

For example, as shown in FIG. 2A, the first memory controller 201 writes the M data symbols into the data memory space of the first memory, and writes the N first redundant symbols into the first ECC memory space of the first memory.

For example, as shown in FIG. 9, the processing system writes data bits included in the M data symbols into the data memory space of the first memory, and writes redundant bits included in the N first redundant symbols into the first ECC memory space of the first memory. A specific arrangement manner of a memory space occupied by the data symbol or the first redundant symbol is shown in FIG. 9. To be specific, the arrangement manner of the memory space occupied by the data symbol or the first redundant symbol is the arrangement in the 16 rows and the one column.

Optionally, if the first memory is a memory that supports the second ECC encoding (for example, the on-die ECC), the embodiment shown in FIG. 3 further includes step 305*a*. Step 305*a* may be performed before step 305.

305*a*: Perform second ECC encoding on the M data symbols and the N first redundant symbols as data to obtain R second redundant symbols.

Each of the R second redundant symbols includes at least one redundant bit, and R is an integer greater than or equal to 1.

Optionally, step 305*a* specifically includes: The processing system performs second ECC encoding on the M data symbols and the N first redundant symbols as the data to obtain the R second redundant symbols.

Optionally, the second ECC encoding may include: The processing system performs Hamming code encoding on the M data symbols and the N first redundant symbols as the data to obtain the R second redundant symbols.

For example, as shown in FIG. 2A, the first memory controller 201 performs first ECC encoding on the M data symbols to obtain N first redundant symbols. Then, the first memory controller 201 performs second ECC encoding on the M data symbols and the N first redundant symbols as the data to obtain the R second redundant symbols.

For example, as shown in FIG. 2B, the first memory controller 203 performs first ECC encoding on the M data symbols to obtain N first redundant symbols. Then, the first memory controller 203 transmits the M data symbols and the N first redundant symbols to the second memory controller 204 through a memory interface. The second memory controller 204 performs second ECC encoding on the M data symbols and the N first redundant symbols as the data to obtain the R second redundant symbols.

Based on step 305*a*, optionally, step 305 specifically includes: writing the M data symbols into the data memory space of the first memory, writing the N first redundant symbols into the first ECC memory space of the first memory, and writing the R second redundant symbols into the second ECC memory space of the first memory.

For example, with reference to FIGS. 2B and 9, the second memory controller 204 performs second ECC encoding on the data symbol 1 to a data symbol 8 that are to be stored into the data device 1, to obtain a second redundant symbol of the data device 1. Then, the second memory controller 204 separately writes the data symbol 1 to the data symbol 8 and the second redundant symbol of the data device 1 into spatial locations corresponding to the data device 1. The second memory controller 204 performs second ECC encoding on a data symbol 9 to a data symbol 16 that are to be stored into a data device 2, to obtain a second redundant symbol of the data device 2. Then, the second memory controller 204 writes the data symbol 9 to the data symbol 16 and the second redundant symbol of the data device 2 into the data device 2.

The second memory controller 204 performs second ECC encoding on a data symbol 17 to a data symbol 24 that are to be stored into a data device 3, to obtain a second redundant symbol of the data device 3. Then, the second memory controller 204 writes the data symbol 17 to the data symbol 24 and the second redundant symbol of the data device 3 into the data device 3. The second memory controller 204 performs second ECC encoding on a data symbol 25 to the data symbol 32 that are to be stored into the data device 4, to obtain a second redundant symbol of the data device 4. Then, the second memory controller 204 writes the data symbol 25 to the data symbol 32 and the second redundant symbol of the data device 4 into the data device 4. The second memory controller 204 performs second ECC encoding on the N first redundant symbols (including a redundant symbol in an error detection space and the redundant symbol 1 to the redundant symbol 4) to be stored into the ECC device, to obtain a second redundant symbol of the ECC device. Then, the second memory controller 204 writes the N first redundant symbols and the second redundant symbol of the ECC device into the ECC device.

In FIG. 2B, one second memory controller 204 is used for writing data into each memory device shown in FIG. 9. In actual application, each memory device may be connected to one second memory controller, and different memory devices are connected to different second memory controllers. The second memory controller connected to each memory device performs second ECC encoding on a data symbol or a first redundant symbol that is to be written into the memory device, to obtain a second redundant symbol of the memory device. Then, the second memory controller writes the data symbol or the first redundant symbol to be written into the memory device and the second redundant symbol of the memory device into spatial locations corresponding to the memory device.

The following describes some scenarios to which the technical solutions are applicable by using the processing system shown in FIG. 2B.

Scenario 1: In a process in which the processing system reads the M data symbols and the N first redundant symbols from the first memory, if the second memory controller 204 performs read error detection and detects no error, the second memory controller 204 discards the second redundant symbol. Then, the second memory controller 204 transmits the M data symbols and the N first redundant symbols back to the first memory controller 203 through a first memory channel.

Scenario 2: In a process in which the processing system reads the M data symbols and the N first redundant symbols from the first memory, if the second memory controller 204 performs read error detection and detects an error, and a range of error data is within an error correction capability range of the second memory controller 204, the second memory controller 204 performs error correction by using the second redundant symbol. Then, the second memory controller 204 transmits corrected M data symbols and N first redundant symbols back to a buffer of the first memory controller 203 through a first memory channel.

Scenario 3: In a process in which the processing system reads the M data symbols and the N first redundant symbols from the first memory, if the second memory controller 204 performs read error detection and detects an error, and a range of error data exceeds an error correction capability range of the second memory controller 204, the second memory controller 204 discards the second redundant symbol (in other words, does not perform second ECC error correction). The second memory controller 204 directly transmits the M data symbols and the N first redundant symbols back to the first memory controller 203 through a first memory channel. The second memory controller 204 sends an error notification to the first memory controller 203, to indicate that the second memory controller 204 detects the error in the M data symbols but fails to correct the error.

Scenario 4: In a process in which the processing system reads the M data symbols and the N first redundant symbols from the first memory, if the second memory controller 204 performs read error detection and detects an error, and a range of error data exceeds an error detection capability range of the second memory controller 204, the second memory controller 204 may mistakenly consider that error correction can be performed and attempt to perform error correction, and may mis-correct the data. In other words, an error area is further expanded. However, the second memory controller does not know. Then, the second memory controller 204 transmits, back to the first memory controller 203 through a first memory channel, M data symbols and N first redundant symbols that are obtained through second ECC correction. This scenario is a second ECC (for example, the on-die ECC) mis-correction scenario.

The technical solutions are applicable to the foregoing scenario 1 to scenario 4, especially the mis-correction scenario in the scenario 4. In the scenario 2 and the scenario 4, when the second memory controller 204 performs error correction on the M data symbols and the N first redundant symbols by using the R second redundant symbols, a specially designed generator matrix of second ECC code is used, and a result is that a data change range in a second ECC error correction process is limited to a small range, for example, a leftmost ¼ memory space of a memory space occupied by "the M data symbols and the N first redundant symbols". Therefore, the first error distribution area information indicates information such as the error area detected in the second ECC memory space or the additional mis-correction area generated by performing error correction in the second ECC memory space. The processing system may set, in a data writing process, an appropriate arrangement manner of a memory space occupied by a symbol, so that the processing system performs maximized error detection and maximized error correction on data in the mis-correction scenario in the scenario 4 subsequently.

In a data application process, the processing system may read the M data symbols and the N first redundant symbols from the first memory. If the first memory is the memory that supports the second ECC encoding (for example, the on-die ECC), both the M data symbols and the N first redundant symbols may be obtained by performing error detection and error correction processing in the second ECC memory space. Specifically, as shown in FIG. 9, the M data symbols include the data symbol 1 to the data symbol 32. The N first redundant symbols include a first redundant symbol 1 to the second redundant symbol (which may also be referred to as an error correction symbol 1 to an error correction symbol 4) and an error detection symbol in the error detection space. The error detection space includes four error detection symbols. Therefore, the processing system can detect a maximum of four error data symbols. Specifically, the processing system performs error detection on a data symbol in a third data by using the error detection symbol in the error detection space, to determine that errors occur in data bits in the data symbol 1, the data symbol 2, a data symbol 21, and the data symbol 23. Specifically, the processing system may determine how many data bit errors may exist in the data symbol 1, the data symbol 2, the data symbol 21, and the data symbol 23. Because one error correction symbol can correct one data symbol, the processing system may use the first redundant symbol 1 to correct the data symbol 1, use a first redundant symbol 2 to correct the data symbol 2, use a first redundant symbol 3 to correct the data symbol 21, and use the first redundant symbol 4 to correct the data symbol 23. Any error correction symbol can correct any data symbol. For example, the processing system herein may alternatively use the first redundant symbol 2 to correct the data symbol 1.

Optionally, after the second ECC memory space performs error detection and error correction on the data, the first memory controller may be notified of an error detection result and an error correction status of the second ECC memory space by using Alert_N Pin. Therefore, the first memory controller may determine the error detection result and the error correction status of the second ECC memory space. This helps further enhance an error detection capability and an error correction capability of the first memory controller.

It can be learned that, in the data writing process, the processing system determines, with reference to the first error distribution area information of the at least one memory space in the plurality of memory spaces, the first arrangement manner of the memory space occupied by the data symbol. The first arrangement manner matches or is strongly associated with the arrangement manner of the specific area indicated by the first error distribution area information. In this way, an error detection capability of the error detection space in the first ECC memory space of the first memory and a repair capability of an error correction space in the first ECC memory space of the first memory are fully utilized, and the error area is covered to a maximum extent, so that maximized error detection capability and maximized error correction capability are obtained, and reliability is improved. In addition, the first memory may be a memory storage medium that supports second-level ECC, and M data bits may be obtained by performing error detection and error correction in the second ECC memory space. In other words, first-level ECC memory and the second-level ECC can jointly perform error detection and error correction on the data, so that the system reliability is improved.

The first memory may be the memory that supports the second ECC encoding (for example, the on-die ECC), and the M data bits may be obtained by performing error detection and error correction processing in the second ECC memory space. In other words, the first-level ECC memory and the second-level ECC jointly perform error detection and error correction on the data, to implement first-layer ECC protection and second-layer ECC protection for the data, and implement collaboration to achieve more powerful error detection, error correction, and fault tolerance capabilities. It is clear that the technical solutions are described herein by using two-layer ECC protection as an example. In actual application, the processing system can provide ECC protection for data at more layers. For example, the processing system may further implement third-layer ECC protection on the data by using another ECC memory.

Figure 8:
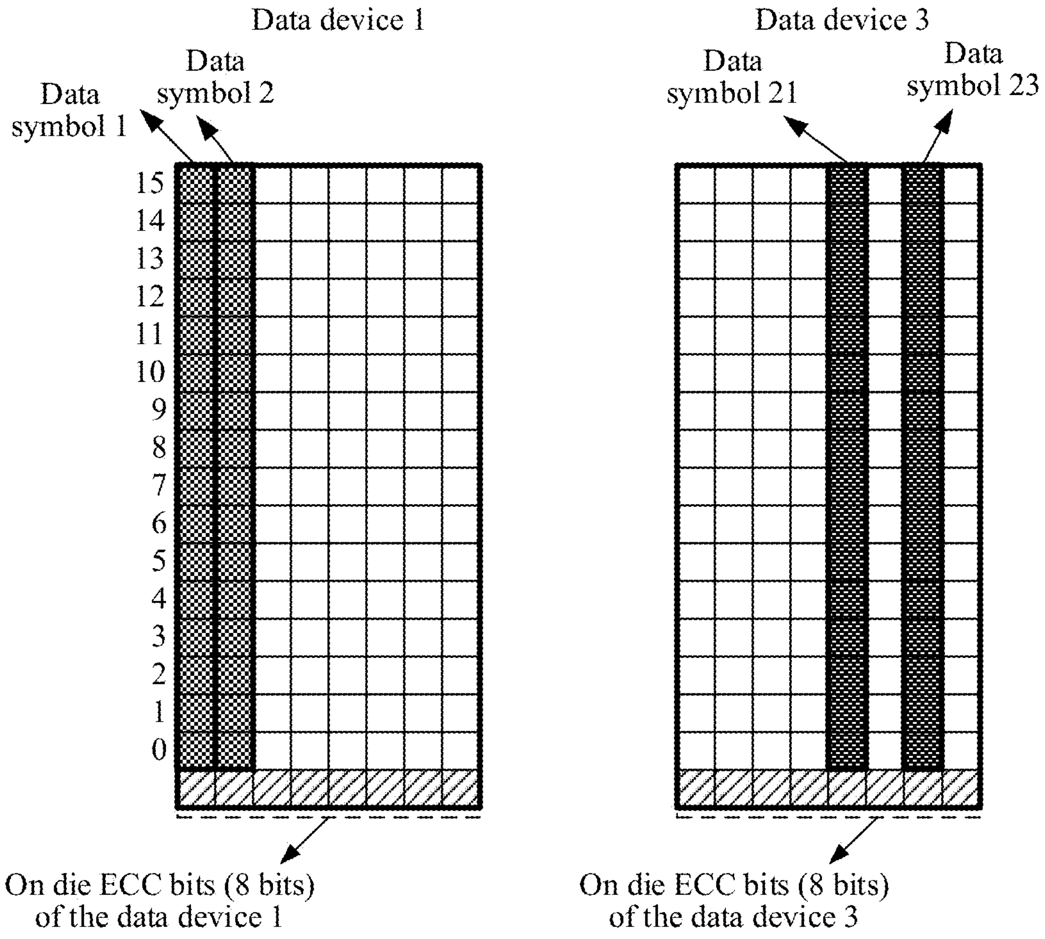
FIG. 8 is a schematic diagram of an error data symbol in a first memory according to an embodiment.

For example, if the processing system determines the first arrangement manner of the memory space occupied by the data symbol as the arrangement in the four rows and the four columns shown in FIG. 10, because an error detection space includes four error detection symbols, the processing system can detect only four data symbol errors by using the error detection symbols in the error detection space. For example, the processing system detects that errors occur in a data symbol 1 to a data symbol 4, and cannot detect that errors also occur in a data symbol 21 to a data symbol 24. In other words, eight data symbol errors actually occur, but the processing system can detect only four data symbol errors. Specifically, the processing system may determine how many data bit errors exist in each data symbol of the data symbol 1 to the data symbol 4. Because one error correction symbol can correct one data symbol, the processing system may use a first redundant symbol 1 to correct the data symbol 1, use a first redundant symbol 2 to correct a data symbol 2, use a first redundant symbol 3 to correct a data symbol 3, and use a first redundant symbol 4 to correct the data symbol 4. It can be learned that an internal space for actual error correction of the processing system has only 32 bits, to be specific, data bits in the first column and the second column of the data device 1. However, data bits in the fifth column and the seventh column of the data device 3 cannot be corrected. Therefore, the processing system cannot implement the maximized error detection and the maximized error correction by using an arrangement manner of a memory space occupied by the symbols shown in FIG. 10. However, in the technical solutions, the processing system determines, with reference to the first error distribution area information of the at least one memory space in the plurality of memory spaces, the first arrangement manner of the memory space occupied by the data symbol. The first arrangement manner matches or is strongly associated with the arrangement manner of the specific area indicated by the first error distribution area information, for example, a data error scenario shown in FIG. 8. In other words, in a data error scenario similar to that in FIG. 10, the processing system sets the first arrangement manner of the memory space occupied by the data symbols in the arrangement in the 16 rows and the one column shown in FIG. 9. The processing system may detect errors of the data symbol 1, the data symbol 2, the data symbol 21, and a data symbol 23. In addition, the processing system may use the four first redundant symbols to respectively correct the data symbol 1, the data symbol 2, the data symbol 21, and the data symbol 23. In other words, in the technical solutions, the processing system can implement the maximized error detection and the maximized error correction on data. In this way, the maximized error detection capability and the maximized error correction capability of the first ECC memory space of the first memory are fully utilized, the data error area is covered to the maximum extent, and the reliability is improved.

Second ECC is not limited to the on-die ECC, and any two-level or multi-level cascaded error detection and correction algorithm needs to achieve a complementary effect and a non-overflow effect of encoded data ranges and encoded arrangement manners. This helps maximize an error detection capability and an error correction capability of the first memory or a multi-level memory.

Optionally, the embodiment shown in FIG. 6 further includes step 306 to step 310. Step 306 to step 310 may be performed after step 305.

306: Read all data from the first memory.

All the data includes data bits and a redundant bit.

For example, if the first error distribution area information of the at least one memory space changes, the processing system may read all the data from the first memory. Therefore, it is convenient for the processing system to re-encode the data bits in all the data, to change the arrangement manner of the memory space occupied by the data symbol. This helps the processing system perform error detection and error correction on the data to a maximum extent subsequently.

307: Determine, based on second error distribution area information of at least one memory space in the plurality of memory spaces, a second arrangement manner of the memory space occupied by the data symbol.

Specifically, an error distribution area of the at least one memory space dynamically changes. Herein, the second error distribution area information of the at least one memory space is used for representing an error distribution area of the at least one memory space after the dynamic change. To be specific, the second error distribution area information of the at least one memory space indicates a specific area, in the at least one memory space, in which an error data bit falls when a data error occurs in the at least one memory space after the dynamic change.

For example, the first error distribution area information is used in a case in which, when a data error occurs in a memory device, a specific area in which an error data bit falls in the memory device is the area in which the data error occurs, as shown in FIG. 5A. The second error distribution area information indicates that when a data error occurs in a memory device, a specific area in which an error data bit falls in the memory device is the area in which the data error occurs, as shown in FIG. 5B.

Specifically, the processing system determines, based on the second error distribution area information of the at least one memory space in the plurality of memory spaces, the second arrangement manner of the memory space occupied by the data symbol.

The second arrangement manner of the memory space occupied by the data symbol matches an arrangement manner of the area indicated by the second error distribution area information. In other words, the second arrangement manner of the memory space occupied by the data symbol is strongly associated with the arrangement manner of the area indicated by the second error distribution area information.

For example, each data symbol occupies the 16-bit memory space. In the case of the arrangement manner of the area in which the data error occurs shown in FIG. 5B, the processing system may set the second arrangement manner of the memory space occupied by the data symbol to the arrangement manner shown in FIG. 6C.

Optionally, the embodiment shown in FIG. 3 further includes step 307*a*. Step 307*a* may be performed before step 307.

307*a*: Obtain the second error distribution area information of the at least one memory space in the plurality of memory spaces.

Specifically, the processing system obtains the second error distribution area information of the at least one memory space in the plurality of memory spaces.

Optionally, the processing system may determine the second error distribution area information of the at least one memory space in the plurality of memory spaces based on a historical data error.

Specifically, the processing system may determine, with reference to the data error in a historical data reading result, a distribution area of data in which an error frequently occurs in the at least one memory space. Then, the processing system updates an error distribution area of the at least one memory space based on the distribution area of the data in which the error frequently occurs in the at least one memory space, to obtain the second error distribution area information of the at least one memory space.

Optionally, the error distribution area of the at least one memory space dynamically changes, and a reason why the error distribution area of the memory space dynamically changes is related to an operating environment, a business mode, and the like of the processing system. For example, the operating environment includes an operating temperature of the processing system and an altitude of a place at which a device is located. The business mode includes frequent storage of data to specific locations during business processing. The processing system may update the error distribution area of the at least one memory space within a period of time with reference to the historical data error, to help maximize the error correction capability of the first ECC memory space of the first memory.

308: Determine, based on the second arrangement manner of the memory space occupied by the data symbol, the data bits in all the data as P data symbols.

Each of the P data symbols includes a plurality of data bits, and P is an integer greater than or equal to 1.

Step 308 is similar to step 303. For details, refer to the foregoing related descriptions.

Figure 11:
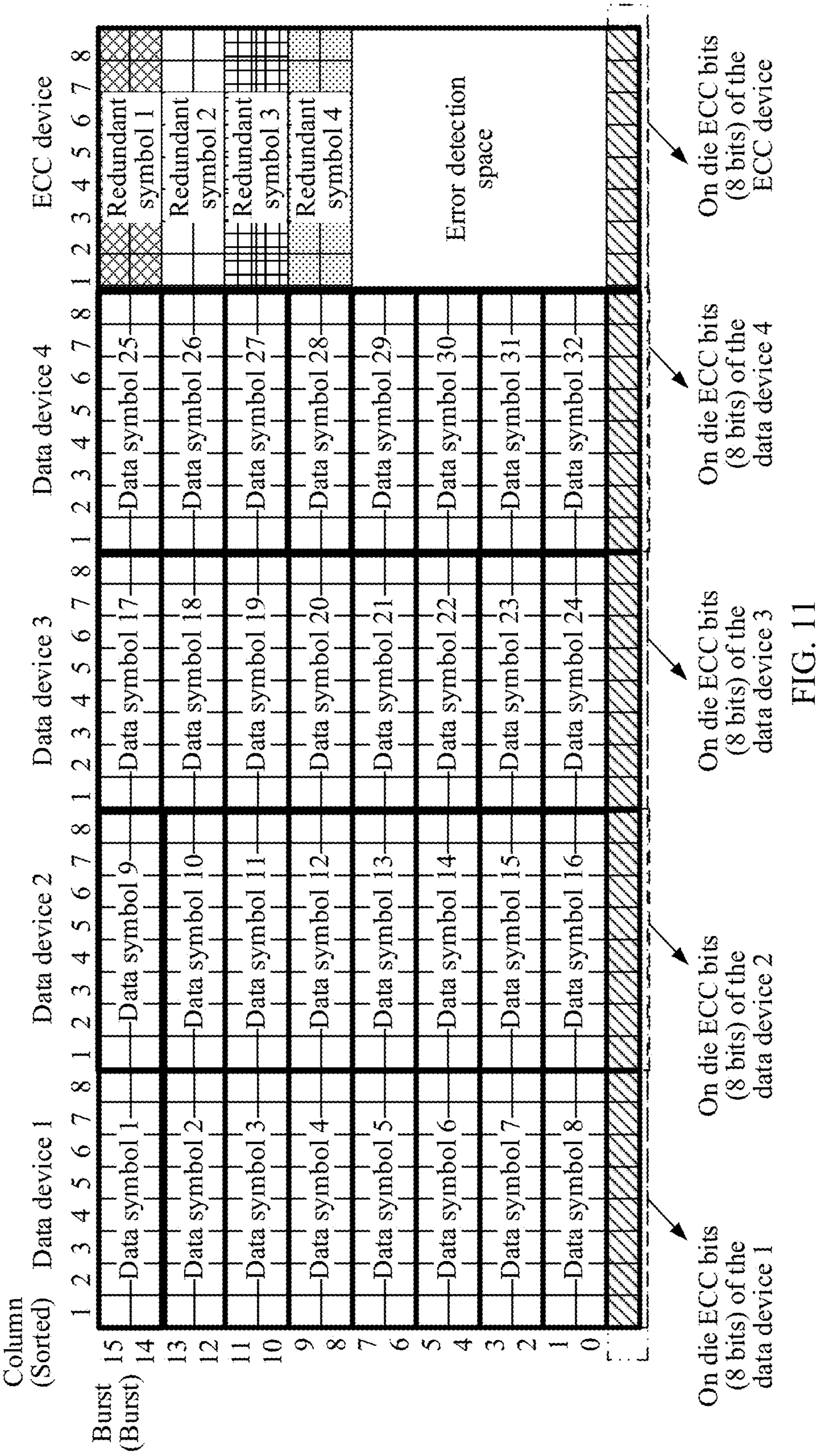
FIG. 11 is a schematic diagram of P data symbols and Q first redundant symbols in a first memory according to an embodiment.

For example, the second arrangement manner of the memory space occupied by the data symbol is the arrangement manner shown in FIG. 6C, that is, the arrangement in the two rows and the eight columns. The data bits in all the data include 512 bits. The processing system may determine the 512 bits as 32 data symbols with reference to a destination memory address of the data bit in all the data and the second arrangement manner. For example, as shown in FIG. 11, the processing system divides a data bit that is in the first data and that is to be stored in memory spaces of the fifteenth row and the sixteenth row in a data device 1 into a data bit included in a data symbol 1. The processing system divides a data bit that is in the first data and that is to be stored in memory spaces of the thirteenth row and the fourteenth row in the data device 1 into a data bit included in a data symbol 2. By analogy, the processing system divides a data bit that is in the first data and that is to be stored in memory spaces of the first row and the second row in a data device 4 into a data bit included in a data symbol 32. It can be learned that each data symbol is arranged in the second arrangement manner.

309: Perform ECC encoding on the P data symbols to obtain Q first redundant symbols.

Each of the Q first redundant symbols includes at least one redundant bit, and Q is an integer greater than or equal to 1.

Step 309 is similar to step 304. For details, refer to related descriptions of step 304.

310: Write the P data symbols and the Q first redundant symbols into the first memory.

Step 310 is similar to step 305. For details, refer to related descriptions of step 305.

For example, as shown in FIG. 11, the processing system writes the data bits included in the P data symbols and the redundant bits included in the Q first redundant symbols into the first memory. A specific arrangement manner of a memory space occupied by each symbol is shown in FIG. 11. The arrangement manner of the memory space occupied by each symbol is arrangement in two rows and eight columns.

Optionally, the embodiment shown in FIG. 3 further includes step 310*a*. Step 310*a* may be performed before step 310.

310*a*: Perform second ECC encoding on the P data symbols and the Q first redundant symbols as data to obtain Y second redundant symbols.

Each of the P second redundant symbols includes at least one redundant bit, and P is an integer greater than or equal to 1.

Step 310*a* may be similar to step 305*a*. For details, refer to related descriptions of step 310*a*.

Based on step 310*a*, optionally, step 310 specifically includes: writing the P data symbols into the data memory space of the first memory, writing the Q first redundant symbols into the first ECC memory space of the first memory, and writing the Y second redundant symbols into the second ECC memory space of the first memory.

It can be learned that, if an error distribution area of the at least one memory space of the first memory changes, the processing system may re-encode the data bits in all the data, to change the arrangement manner of the memory space occupied by the data symbol. This helps perform maximized error detection and maximized error correction on the data in a subsequent data reading process of the processing system, and the system reliability is improved.

A data writing method is applied to the processing system, the processing system includes the first memory, and the first memory includes the plurality of memory spaces. The method includes: obtaining the first data, where the first data is the data to be written into the first memory; determining, based on the first error distribution area information of the at least one memory space in the plurality of memory spaces, the first arrangement manner of the memory space occupied by the data symbol; determining the first data as the M data symbols based on the first arrangement manner of the memory space occupied by the data symbol, where each of the M data symbols includes the plurality of data bits, and M is the integer greater than or equal to 1; then performing ECC encoding on the M data symbols to obtain the N first redundant symbols, where each of the N first redundant symbols includes the at least one redundant bit, and N is the integer greater than or equal to 1; and writing the M data symbols into the data memory space of the first memory, and writing the N first redundant symbols into the first ECC memory space of the first memory. It can be learned that the processing system determines, based on the first error distribution area information of the at least one memory space in the plurality of memory spaces, the first arrangement manner of the memory space occupied by the data symbol. In other words, the processing system designs, with reference to distribution of error areas in the at least one memory space, the arrangement manner of the memory space occupied by the data symbol. Then, the processing system determines the first data as the M data symbols with reference to the first arrangement manner of the memory space occupied by the data symbol, where each of the M data symbols includes the data bits. Because destination addresses of the data bits in the first data are known, the processing system divides, with reference to the first arrangement manner, the data bits that are in the first data and that can form a shape of the first arrangement manner into a same data symbol. Therefore, this helps perform maximized error detection and maximized error correction on the data in the subsequent data reading process of the processing system, and the system reliability is improved. In this way, the maximized error detection capability and the maximized error correction capability of the first ECC memory space of the first memory are fully utilized, the data error area is covered to the maximum extent, and the system reliability is improved.

The foregoing describes the data writing method. The following describes a processing system.

Figure 12:
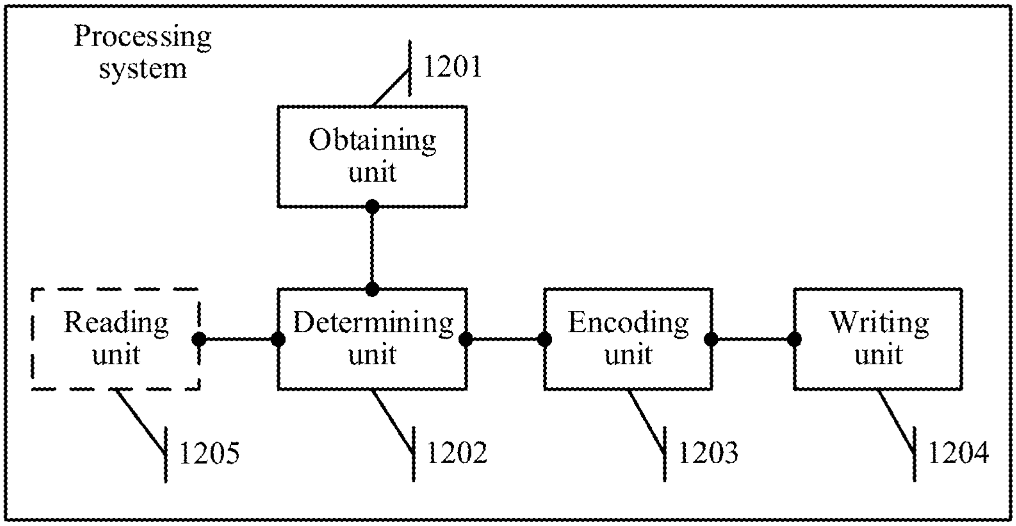
FIG. 12 is a schematic diagram of a structure of a processing system according to an embodiment.

FIG. 12 is a schematic diagram of a structure of a processing system according to an embodiment. The processing system includes a first memory, and the first memory includes a plurality of memory spaces. The processing system includes an obtaining unit 1201, a determining unit 1202, an encoding unit 1203, and a writing unit 1204. The processing system further includes a reading unit 1205.

The obtaining unit 1201 is configured to obtain first data, where the first data is data to be written into the first memory.

The determining unit 1202 is configured to: determine, based on first error distribution area information of at least one memory space in the plurality of memory spaces, a first arrangement manner of a memory space occupied by a data symbol; and determine the first data as M data symbols based on the first arrangement manner of the memory space occupied by the data symbol, where each of the M data symbols includes a plurality of data bits, and M is an integer greater than or equal to 1.

The encoding unit 1203 is configured to perform first error correction code ECC encoding on the M data symbols to obtain N first redundant symbols, where each of the N first redundant symbols includes at least one redundant bit, and N is an integer greater than or equal to 1.

The writing unit 1204 is configured to: write the M data symbols into a data memory space of the first memory, and write the N first redundant symbols into a first ECC memory space of the first memory.

In a possible implementation, the first error distribution area information of the at least one memory space indicates a specific area, in the at least one memory space, in which an error data bit falls when a data error occurs in the at least one memory space.

In another possible implementation, each data symbol occupies an 8-bit memory space, and the first arrangement manner of the memory space occupied by the data symbol includes any one of the following: arrangement in four rows and two columns, arrangement in two rows and four columns, arrangement in eight rows and one column, and arrangement in one row and eight columns; or each data symbol occupies a 16-bit memory space, and the first arrangement manner of the memory space occupied by the data symbol includes any one of the following: arrangement in four rows and four columns, arrangement in eight rows and two columns, arrangement in two rows and eight columns, and arrangement in 16 rows and one column; or each data symbol occupies a 32-bit memory space, and the first arrangement manner of the memory space occupied by the data symbol includes any one of the following: arrangement in one row and 32 columns, arrangement in 32 rows and one column, arrangement in two rows and 16 columns, arrangement in 16 rows and two columns, arrangement in four rows and eight columns, and arrangement in eight rows and four columns.

In another possible implementation, the obtaining unit 1201 is further configured to: obtain the first error distribution area information of the at least one memory space in the plurality of memory spaces.

In another possible implementation, the reading unit 1205 is configured to read all data from the first memory, where all the data includes data bits and a redundant bit.

The determining unit 1202 is further configured to: determine, based on second error distribution area information of the at least one memory space in the plurality of memory spaces, a second arrangement manner of the memory space occupied by the data symbol; and determine the data bits in all the data as P data symbols based on the second arrangement manner of the memory space occupied by the data symbol, where each of the P data symbols includes a plurality of data bits, and P is an integer greater than or equal to 1.

The encoding unit 1203 is further configured to: perform first ECC encoding on the P data symbols to obtain Q first redundant symbols, where each of the Q first redundant symbols includes at least one redundant bit, and Q is an integer greater than or equal to 1.

The writing unit 1204 is further configured to: write the P data symbols into the data memory space of the first memory, and write the Q first redundant symbols into the first ECC memory space of the first memory.

In another possible implementation, the obtaining unit 1201 is further configured to: obtain the second error distribution area information of the at least one memory space in the plurality of memory spaces.

In another possible implementation, the obtaining unit 1201 is further configured to: determine the second error distribution area information of the at least one memory space in the plurality of memory spaces based on a historical data error.

In another possible implementation, the data symbol and the first redundant symbol are RS code symbols; or the data symbol and the first redundant symbol are BCH code symbols.

In another possible implementation, the first memory is an on-die ECC memory.

In another possible implementation, the encoding unit 1203 is further configured to: perform first ECC encoding on the M data symbols by using a finite field encoding algorithm to obtain the N first redundant symbols, where the finite field encoding algorithm includes an RS algorithm, a BCH algorithm, or the like.

In another possible implementation, the first memory is a memory that supports second ECC encoding (for example, on-die ECC), and the first memory further includes a second ECC memory space; and the encoding unit 1203 is further configured to: perform second ECC encoding on the M data symbols and the N first redundant symbols as data to obtain R second redundant symbols, where each of the R second redundant symbols includes at least one redundant bit, and R is an integer greater than or equal to 1.

The writing unit 1204 is further configured to: write the M data symbols into the data memory space, write the N first redundant symbols into the first ECC memory space, and write the R second redundant symbols into the second ECC memory space.

Figure 13:
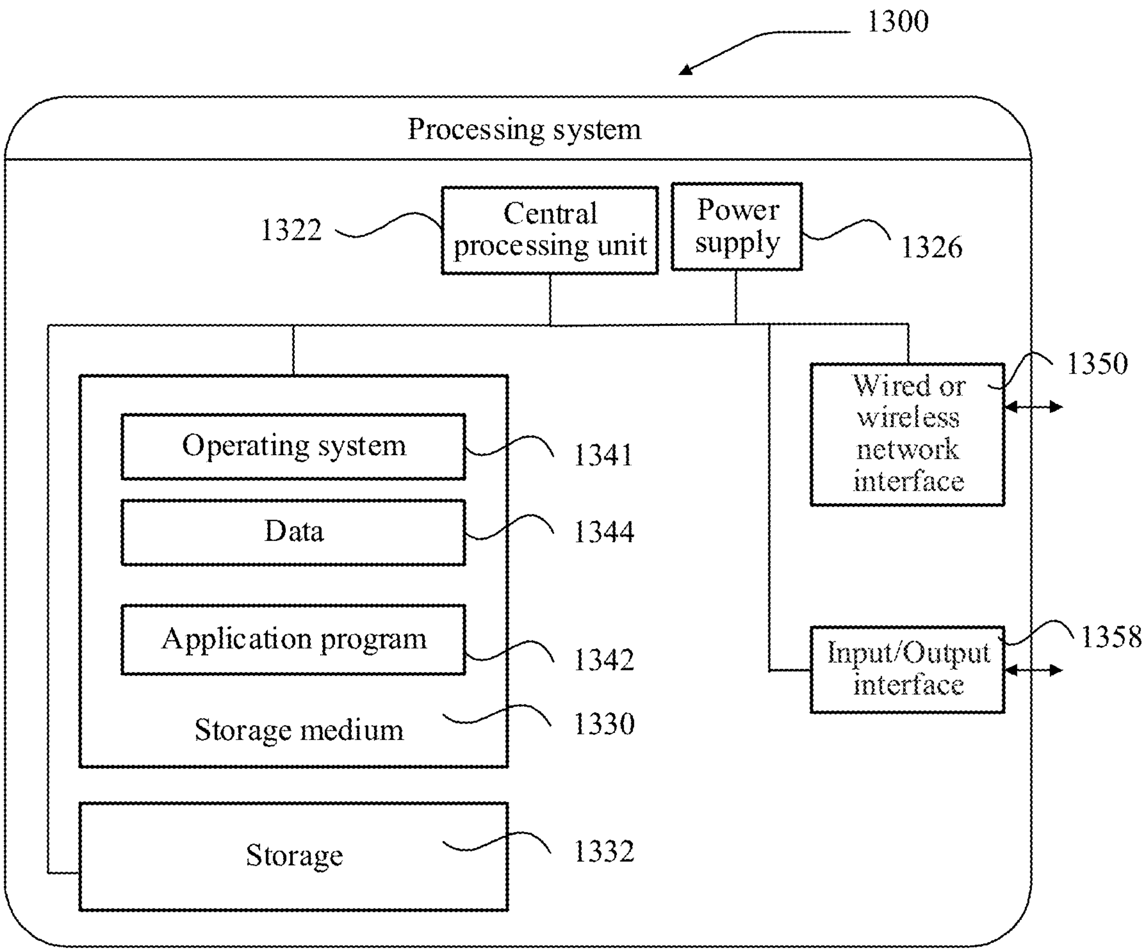
FIG. 13 is a schematic diagram of another structure of a processing system according to an embodiment.

Refer to FIG. 13. A great difference may be generated due to different configurations or performance of a processing system 1300, and the processing system 1300 may include one or more CPUs 1322 (for example, one or more processors), a storage 1332, and one or more storage media 1330 storing an application program 1342 or data 1344 (for example, one or more mass storage devices).

The storage 1332 and the storage medium 1330 may be transient storage or persistent storage. The program stored in the storage medium 1330 may include one or more modules. Each module may include a series of instruction operations for the processing system. Further, the central processing unit 1322 may be configured to: communicate with the storage medium 1330, and perform, on the processing system 1300, the series of instruction operations in the storage medium 1330.

The processing system 1300 may further include one or more power supplies 1326, one or more wired or wireless network interfaces 1350, one or more input/output interfaces 1358, and/or one or more operating systems 1341.

Specific steps performed by the processing system in FIG. 3 in the foregoing embodiment may be based on a structure of the processing system shown in FIG. 13. The central processing unit 1322 is configured to perform the following solution: obtaining first data, where the first data is data to be written into a first memory; determining, based on first error distribution area information of at least one memory space in a plurality of memory spaces, a first arrangement manner of a memory space occupied by a data symbol; determining the first data as M data symbols based on the first arrangement manner of the memory space occupied by the data symbol, where each of the M data symbols includes a plurality of data bits, and M is an integer greater than or equal to 1; performing error correction code ECC encoding on the M data symbols to obtain N first redundant symbols, where each of the N first redundant symbols includes at least one redundant bit, and N is an integer greater than or equal to 1; and writing the M data symbols into a data memory space of the first memory, and writing the N first redundant symbols into a first ECC memory space of the first memory.

In a possible implementation, the first error distribution area information of the at least one memory space indicates a specific area, in the at least one memory space, in which an error data bit falls when a data error occurs in the at least one memory space.

In another possible implementation, each data symbol occupies an 8-bit memory space, and the first arrangement manner of the memory space occupied by the data symbol includes any one of the following: arrangement in four rows and two columns, arrangement in two rows and four columns, arrangement in eight rows and one column, and arrangement in one row and eight columns; or each data symbol occupies a 16-bit memory space, and the first arrangement manner of the memory space occupied by the data symbol includes any one of the following: arrangement in four rows and four columns, arrangement in eight rows and two columns, arrangement in two rows and eight columns, and arrangement in 16 rows and one column; or each data symbol occupies a 32-bit memory space, and the first arrangement manner of the memory space occupied by the data symbol includes any one of the following: arrangement in one row and 32 columns, arrangement in 32 rows and one column, arrangement in two rows and 16 columns, arrangement in 16 rows and two columns, arrangement in four rows and eight columns, and arrangement in eight rows and four columns.

In another possible implementation, the central processing unit 1322 is further configured to: obtain the first error distribution area information of the at least one memory space in the plurality of memory spaces.

In another possible implementation, the central processing unit 1322 is further configured to: read all data from the first memory, where all the data includes the data bits and the redundant bit; determine, based on second error distribution area information of the at least one memory space in the plurality of memory spaces, a second arrangement manner of the memory space occupied by the data symbol; and determine the data bits in all the data as P data symbols based on the second arrangement manner of the memory space occupied by the data symbol, where each of the P data symbols includes a plurality of data bits, and P is an integer greater than or equal to 1; perform ECC encoding on the P data symbols to obtain Q first redundant symbols, where each of the Q first redundant symbols includes at least one redundant bit, and Q is an integer greater than or equal to 1; and write the P data symbols into the data memory space of the first memory, and write the Q first redundant symbols into the first ECC memory space of the first memory.

In another possible implementation, the central processing unit 1322 is further configured to: obtain the second error distribution area information of the at least one memory space in the plurality of memory spaces.

In another possible implementation, the central processing unit 1322 is further configured to: determine the second error distribution area information of the at least one memory space in the plurality of memory spaces based on a historical data error.

In another possible implementation, the data symbol and the first redundant symbol are RS code symbols; or the data symbol and the first redundant symbol are BCH code symbols.

In another possible implementation, the first memory is an on-die ECC memory.

In another possible implementation, the central processing unit 1322 is further configured to: perform first ECC encoding on the M data symbols by using a finite field encoding algorithm to obtain the N first redundant symbols, where the finite field encoding algorithm includes an RS algorithm, a BCH algorithm, or the like.

In another possible implementation, the first memory is a memory that supports second ECC encoding, and the first memory further includes a second ECC memory space; and the central processing unit 1322 is further configured to: perform second ECC encoding on the M data symbols and the N first redundant symbols as data to obtain R second redundant symbols, where each of the R second redundant symbols includes at least one redundant bit, and R is an integer greater than or equal to 1.

The central processing unit 1322 is further configured to: write the M data symbols into the data memory space, write the N first redundant symbols into the first ECC memory space, and write the R second redundant symbols into the second ECC memory space.

An embodiment further provides a computer program product including instructions. When the computer program product runs on a computer, the computer is enabled to perform the data writing method in embodiments shown in FIG. 3.

An embodiment further provides a computer-readable storage medium, including computer instructions. When the computer instructions are run on a computer, the computer is enabled to perform the data writing method in embodiments shown in FIG. 3.

In another possible design, when a processing system is a chip in a terminal, the chip includes a processing unit and a communication unit, where the processing unit may be, for example, a processor, and the communication unit may be, for example, an input/output interface, a pin, or a circuit. The processing unit may execute computer-executable instructions stored in a storage unit, so that the chip in the terminal performs the data writing method in embodiments shown in FIG. 3. Optionally, the storage unit is a storage unit in the chip, for example, a register or a cache. The storage unit may alternatively be a storage unit outside the chip in the terminal, for example, a read-only memory (ROM) or another type of static storage device that can store static information and instructions, or a random-access memory (RAM).

The processor mentioned in any of the foregoing may be a general central processing unit, a microprocessor, an application-specific integrated circuit (ASIC), or one or more of integrated circuits configured to control program execution of the data writing method in embodiments shown in FIG. 3.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions essentially, or the part contributing to the current technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in embodiments. The foregoing storage medium includes any medium that can store program code, such as a USB flash drive, a removable hard disk, a ROM, a RAM, a magnetic disk, or an optical disc.

The foregoing embodiments are merely intended for describing the technical solutions other than limiting this disclosure. Although this disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments.

What is claimed is:

1. A method comprising:

obtaining first data that are to be written into a memory of a processing system;

determining, based on first error distribution area information of at least one memory space in memory spaces of the memory, a first arrangement manner of a memory space occupied by a data symbol, wherein the data symbol occupies an 8-bit memory space of the memory spaces and the first arrangement manner comprises arrangement in 4 rows and 2 columns, 2 rows and 4 columns, 8 rows and 1 column, or 1 row and 8 columns, wherein the data symbol occupies a 16-bit memory space of the memory spaces and the first arrangement manner comprises arrangement in 4 rows and 4 columns, 8 rows and 2 columns, 2 rows and 8 columns, or 16 rows and 1 column, or wherein the data symbol occupies a 32-bit memory space of the memory spaces and the first arrangement manner comprises arrangement in 1 row and 32 columns, 32 rows and 1 column, 2 rows and 16 columns, 16 rows and 2 columns, 4 rows and 8 columns, or 8 rows and 4 columns;

determining M data symbols of the first data based on the first arrangement manner, wherein each of the M data symbols comprises first data bits, and wherein M is an integer greater than or equal to 1;

performing first error correction code (ECC) encoding on the M data symbols to obtain N redundant symbols, wherein each of the N redundant symbols comprises a first redundant bit, and wherein N is an integer greater than or equal to 1;

writing the M data symbols into a data memory space of the memory; and writing the N redundant symbols into a first ECC memory space of the memory.

2. The method of claim 1, wherein the first error distribution area information indicates a specific area in the at least one memory space in which an error data bit falls when a data error occurs in the at least one memory space.

3. The method of claim 1, further comprising obtaining the first error distribution area information.

4. The method of claim 1, further comprising:

reading, from the memory, second data representing all data in the memory and comprising second data bits and a redundant bit;

determining, based on second error distribution area information of the at least one memory space, a second arrangement manner of the memory space;

determining P data symbols of the second data bits based on the second arrangement manner, wherein each of the P data symbols comprises third data bits, and wherein P is an integer greater than or equal to 1;

performing second ECC encoding on the P data symbols to obtain Q redundant symbols, wherein each of the Q redundant symbols comprises a second redundant bit, and wherein Q is an integer greater than or equal to 1;

writing the P data symbols into the data memory space; and writing the Q redundant symbols into the first ECC memory space.

5. The method of claim 4, further comprising obtaining the second error distribution area information.

6. The method of claim 5, wherein obtaining the second error distribution area information comprises determining the second error distribution area information based on a historical data error.

7. The method of claim 1, wherein the data symbol and the N redundant symbols are Reed-Solomon (RS) code symbols or Bose-Chaudhuri-Hocquenghem (BCH) code symbols.

8. The method of claim 1, further comprising:

performing second ECC encoding on the M data symbols and the N redundant symbols to obtain R redundant symbols, wherein each of the R redundant symbols comprises a second redundant bit, and wherein R is an integer greater than or equal to 1;

writing the M data symbols into the data memory space; and writing the R redundant symbols into a second ECC memory space of the memory.

9. A processing system comprising:

a memory comprising memory spaces, a data memory space, and a first ECC memory space; and a memory controller configured to:

obtain first data that are to be written into the memory;

determine, based on first error distribution area information of at least one memory space in the memory spaces, a first arrangement manner of a memory space occupied by a data symbol, wherein the data symbol occupies an 8-bit memory space of the memory spaces and the first arrangement manner comprises arrangement in 4 rows and 2 columns, 2 rows and 4 columns, 8 rows and 1 column, or 1 row and 8 columns, wherein the data symbol occupies a 16-bit memory space of the memory spaces and the first arrangement manner comprises arrangement in 4 rows and 4 columns, 8 rows and 2 columns, 2 rows and 8 columns, or 16 rows and 1 column, or wherein the data symbol occupies a 32-bit memory space of the memory spaces and the first arrangement manner comprises arrangement in 1 row and 32 columns, 32 rows and 1 column, 2 rows and 16 columns, 16 rows and 2 columns, 4 rows and 8 columns, or 8 rows and 4 columns;

determine M data symbols of the first data based on the first arrangement manner, wherein each of the M data symbols comprises first data bits, and wherein M is an integer greater than or equal to 1;

perform first error correction code (ECC) encoding on the M data symbols to obtain N redundant symbols, wherein each of the N redundant symbols comprises a first redundant bit, and wherein N is an integer greater than or equal to 1;

write the M data symbols into the data memory space; and write the N redundant symbols into the first ECC memory space.

10. The processing system of claim 9, wherein the first error distribution area information indicates a specific area in the at least one memory space in which an error data bit falls when a data error occurs in the at least one memory space.

11. The processing system of claim 9, wherein the memory controller is further configured to obtain the first error distribution area information.

12. The processing system of claim 9, wherein the memory controller is further configured to:

read, from the memory, second data representing all data in the memory and comprising second data bits and a redundant bit;

determine, based on second error distribution area information of the at least one memory space, a second arrangement manner of the memory space;

determine P data symbols of the second data bits based on the second arrangement manner, wherein each of the P data symbols comprises third data bits, and wherein P is an integer greater than or equal to 1;

perform ECC encoding on the P data symbols to obtain Q redundant symbols, wherein each of the Q redundant symbols comprises a second redundant bit, and wherein Q is an integer greater than or equal to 1;

write the P data symbols into the data memory space; and write the Q redundant symbols into the first ECC memory space.

13. The processing system of claim 12, wherein the memory controller is further configured to obtain the second error distribution area information.

14. The processing system of claim 13, wherein the memory controller is further configured to obtain the second error distribution area information by determining the second error distribution area information based on a historical data error.

15. The processing system of claim 9, wherein the data symbol and the N redundant symbols are Reed-Solomon (RS) code symbols or Bose-Chaudhuri-Hocquenghem (BCH) code symbols.

16. The processing system of claim 9, wherein the memory further comprises a second ECC memory space, and wherein the memory controller is further configured to:

perform second ECC encoding on the M data symbols and the N redundant symbols to obtain R redundant symbols, wherein each of the R redundant symbols comprises a second redundant bit, and wherein R is an integer greater than or equal to 1;

write the M data symbols into the data memory space; and write the R redundant symbols into the second ECC memory space.

17. The processing system of claim 9, wherein the memory is an on-die error correction code (ECC) memory.

18. A computer program product comprising instructions that are stored on a non-transitory computer-readable storage medium and that, when executed by one or more processors, cause a processing system to:

obtain first data that are to be written into a memory of the processing system;

determine, based on first error distribution area information of at least one memory space in memory spaces of the memory, a first arrangement manner of a memory space occupied by a data symbol, wherein the data symbol occupies an 8-bit memory space of the memory spaces and the first arrangement manner comprises arrangement in 4 rows and 2 columns, 2 rows and 4 columns, 8 rows and 1 column, or 1 row and 8 columns, wherein the data symbol occupies a 16-bit memory space of the memory spaces and the first arrangement manner comprises arrangement in 4 rows and 4 columns, 8 rows and 2 columns, 2 rows and 8 columns, or 16 rows and 1 column, or wherein the data symbol occupies a 32-bit memory space of the memory spaces and the first arrangement manner comprises arrangement in 1 row and 32 columns, 32 rows and 1 column, 2 rows and 16 columns, 16 rows and 2 columns, 4 rows and 8 columns, or 8 rows and 4 columns;

determine M data symbols of the first data based on the first arrangement manner, wherein each of the M data symbols comprises first data bits, and wherein M is an integer greater than or equal to 1;

perform first error correction code (ECC) encoding on the M data symbols to obtain N redundant symbols, wherein each of the N redundant symbols comprises a first redundant bit, and wherein N is an integer greater than or equal to 1;

write the M data symbols into a data memory space of the memory; and write the N redundant symbols into a first ECC memory space of the memory.

19. The computer program product of claim 18, wherein the first error distribution area information indicates a specific area in the at least one memory space in which an error data bit falls when a data error occurs in the at least one memory space.

20. The computer program product of claim 18, wherein the instructions, when executed by the one or more processors, further cause the processing system to obtain the first error distribution area information.

* * * * *